United States Patent [19]
Imai et al.

[11] Patent Number: 5,953,547
[45] Date of Patent: *Sep. 14, 1999

[54] CAMERA CAPABLE OF PROPERLY OPERATING WHEN RECOVERING FROM POWER INTERRUPTION

[75] Inventors: Yuji Imai, Higashiyamato; Takashi Fujii, Sayama, both of Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/831,568

[22] Filed: Apr. 9, 1997

Related U.S. Application Data

[63] Continuation of application No. 08/519,157, Aug. 21, 1995, abandoned.

[30] Foreign Application Priority Data

Aug. 25, 1994 [JP] Japan ................................ 6-200946
Sep. 5, 1994 [JP] Japan ................................ 6-211386

[51] Int. Cl.⁶ .......................... G03B 7/26; G03B 19/02
[52] U.S. Cl. ...................... 396/277; 396/389; 396/515
[58] Field of Search .................................. 396/277, 389, 396/390, 515, 516, 207

[56] References Cited

U.S. PATENT DOCUMENTS

| | | | |
|---|---|---|---|
| 4,621,914 | 11/1986 | Taniguchi et al. | 354/21 |
| 4,687,307 | 8/1987 | Ohsawa | 354/21 |
| 5,032,854 | 7/1991 | Smart | 354/21 |
| 5,293,191 | 3/1994 | Umetsu | 354/173.1 |
| 5,325,141 | 6/1994 | Shiina et al. | 354/173.1 |
| 5,414,482 | 5/1995 | Iwai et al. | 354/173.1 |
| 5,467,155 | 11/1995 | Miyazaki et al. | 354/21 |
| 5,541,681 | 7/1996 | Cocca et al. | 396/389 |
| 5,598,236 | 1/1997 | Ueda et al. | 396/319 |

FOREIGN PATENT DOCUMENTS 4-136831   5/1992   Japan.

*Primary Examiner*—Eddie C. Lee
*Attorney, Agent, or Firm*—Frishauf, Holtz, Goodman, Langer & Chick, P.C.

[57] ABSTRACT

A camera uses a film cartridge, which has an information recording disk which is rotatable integrally with a cartridge spool shaft and represents information inherent to a film, and feeds the film leading end portion from the cartridge by using a driver. A data detector reads the film information from the disk of the cartridge loaded in the camera. A nonvolatile memory stores the film information read from the disk. When the cartridge is loaded into the camera, the camera feeds the film leading end portion from the cartridge, reads the film information, and writes the read information in the memory. Another camera uses a film having two perforations per frame. The moving amount of the film fed by a motor controller is detected by a film driven roller rotation detector. A perforation on the film is detected by the perforation detector. Prior to at least the driving operation of the motor controller, information indicating the film feeding operation is stored in an EEPROM. The overall operations of the camera are controlled by a CPU. When a power supply is interrupted during the film feeding operation, the CPU determines the position of the next frame to be photographed on the film based on the outputs from the EEPROM, the film driven roller rotation detector, and the perforation detector.

1 Claim, 24 Drawing Sheets

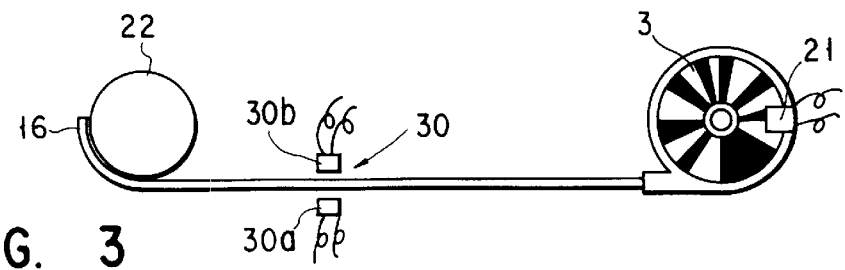
FIG. 3
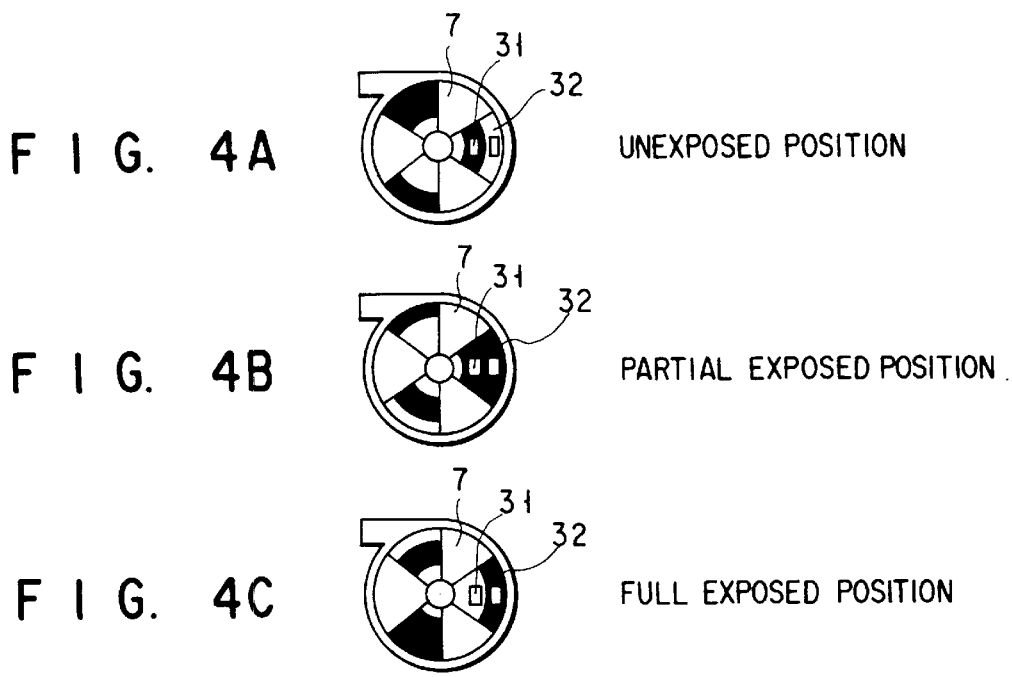
FIG. 4A  UNEXPOSED POSITION
FIG. 4B  PARTIAL EXPOSED POSITION
FIG. 4C  FULL EXPOSED POSITION
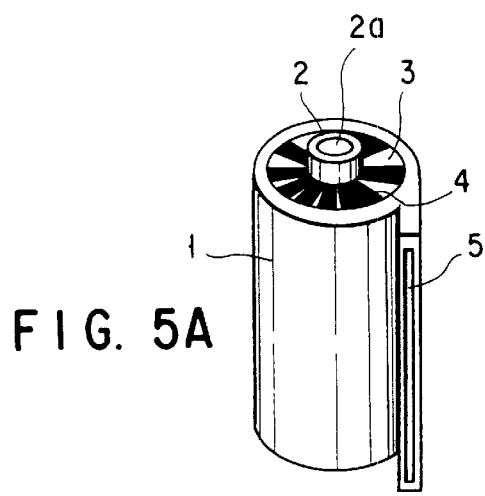
FIG. 5A
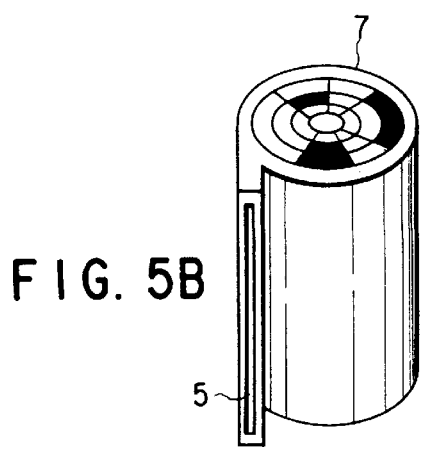
FIG. 5B

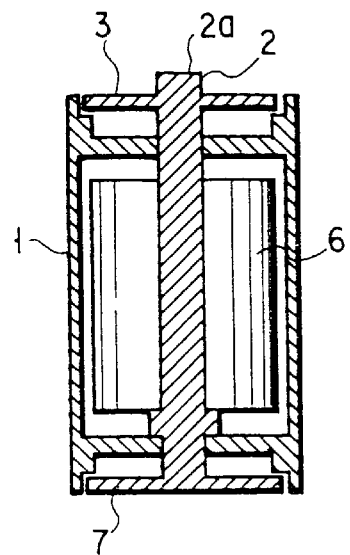
F I G. 6
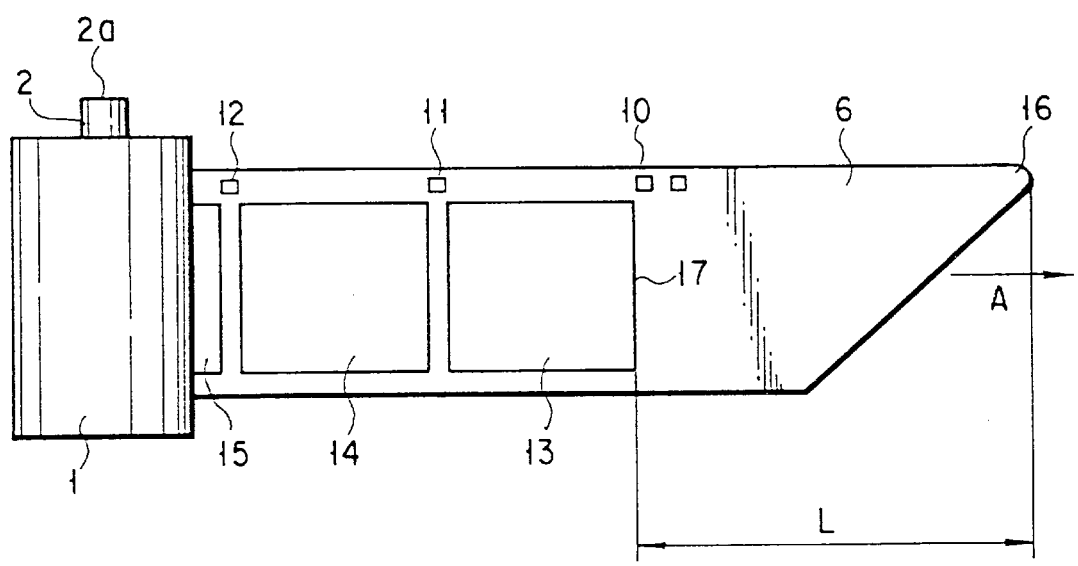
F I G. 7

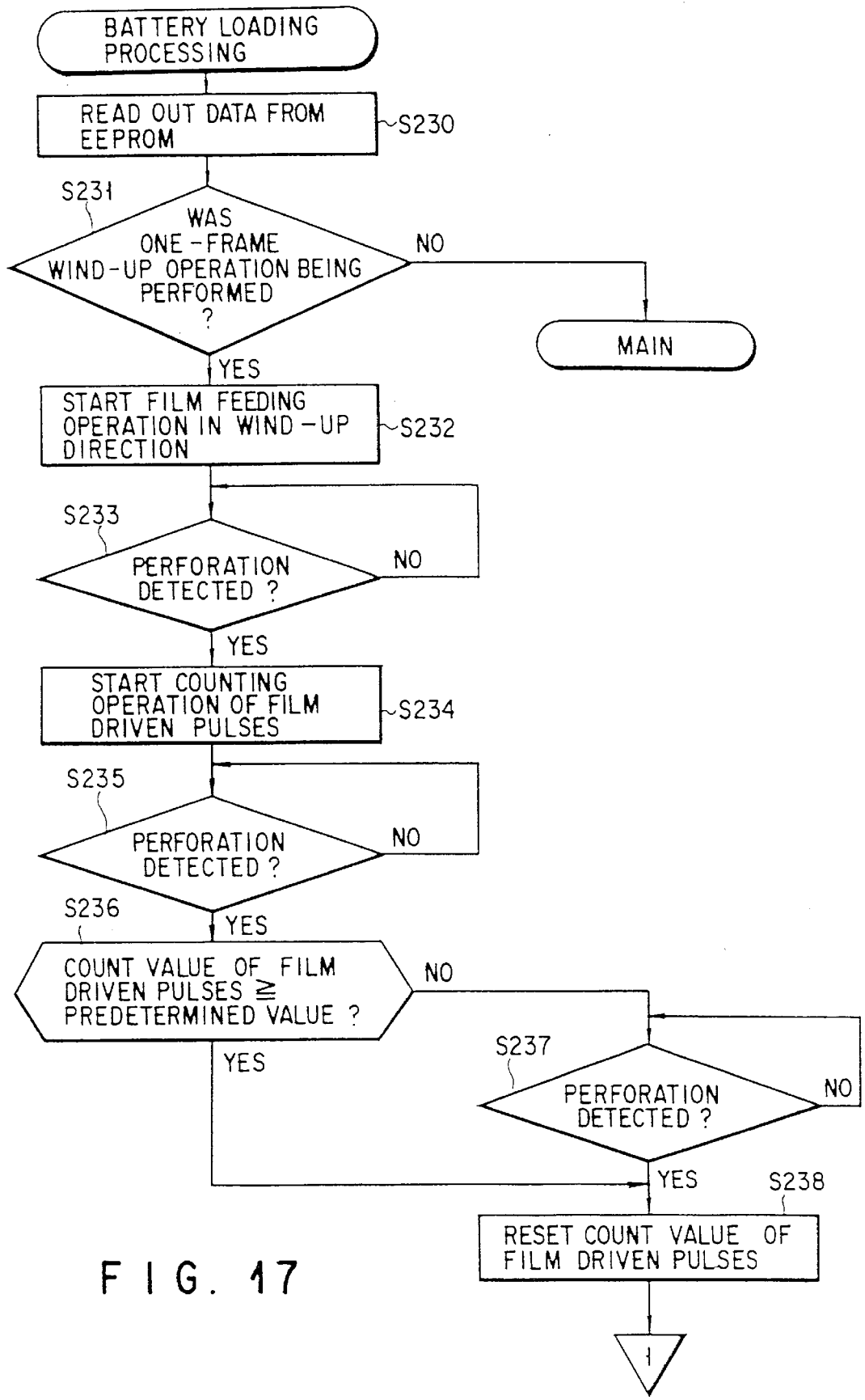
F I G. 17

CAMERA CAPABLE OF PROPERLY OPERATING WHEN RECOVERING FROM POWER INTERRUPTION

This application is a continuation of application Ser. No. 08/519,157, filed Aug. 21, 1995 now abandoned.

BACKGROUND OF THE INVENTION

1. Field of the Invention

The present invention generally relates to a camera and, more particularly, relates to a camera capable of properly operating when recovering from power interruption.

Also, the present invention relates to a camera and, more particularly, to a camera which has a disk-shaped code plate representing information inherent to a film in a film cartridge, and uses a film cartridge from which the leading end portion of a film is fed.

Furthermore, the present invention relates to a camera having a film feed controller and, more particularly, to a camera having a film feed controller which can use a film having two perforations per frame.

2. Description of the Related Art

In recent years, as a film to be loaded into a camera, a film cartridge which has an information recording disk which rotates integrally with a spool shaft in the film cartridge and which records information associated with a film as, for example, bar code information or the like, has been proposed. As a camera using such a film cartridge, various cameras, which read bar code information recorded on the information recording disk or the like upon initially feeding the film stored in the film cartridge, have been conventionally proposed.

For example, a film cartridge disclosed in U.S. Pat. No. 5,032,854 has an information recording disk which is rotatable integrally with a spool shaft arranged in the film cartridge, and records specific information associated with a film. In a camera using this film cartridge, when it is detected that the film cartridge is loaded into a camera main body, the spool shaft in the film cartridge is rotated by utilizing the rotation driving force of, e.g., a driving motor. Upon rotation of the spool shaft, the film, which is stored in the cartridge while being wound around the spool shaft, is externally fed from the film cartridge. In synchronism with the initial feeding operation of the film, information associated with the film and recorded on the information recording disk, i.e., information which corresponds to a DX code printed on the outer surface of a conventional film cartridge and is inherent to the film stored in the film cartridge, is read. Note that U.S. Pat. No. 5,032,854 above does not mention the details about processing of the read film information. Normally, information which is inherent to a film and read from the information recording disk, is stored in, e.g., a RAM (random access memory) in a control circuit (a microcomputer or the like) arranged in the camera and comprising, e.g., a CPU, and the information associated with the film is utilized in a photographing operation.

However, a battery or the like is used as the main power supply of the camera. Upon exchange of the battery when the power supply battery is used up, if a voltage drop takes place at the power supply terminal of the control circuit arranged in the camera main body and comprising, e.g., the CPU, the inherent information which is associated with the film loaded in the camera main body and stored in, e.g., the RAM of the control circuit, may be lost.

More specifically, according to means disclosed in U.S. Pat. No. 5,032,854, when a film is loaded into the camera main body, and is initially fed from the film cartridge, inherent information associated with the film is read from the information recording disk in the film cartridge in synchronism with this feeding operation, and is stored in, e.g., the RAM of the control circuit in the camera main body. At this time, when the power supply battery as the main power supply of the camera is exchanged, a voltage drop occurs at the power supply terminal of the control circuit, and the information associated with the film is lost.

Therefore, when the power supply battery as the main power supply of the camera is exchanged, the information associated with the film must be read again from the information recording disk in the film cartridge.

Furthermore, since the information recording disk rotates integrally with the spool shaft in the film cartridge, when the reading operation of information associated with the film is performed in a state wherein the film with unexposed frames is loaded in the camera main body, the film wound around the spool shaft is undesirably fed upon rotation of the spool shaft and the information recording disk in the film cartridge. At this time, in order to obtain continuously exposed frames on the film, the fed film portion must be rewound for several frames into the film cartridge, resulting in a complex operation sequence of the camera and an extra operation.

On the other hand, in recent years, various proposals associated with films and cameras have also been made. In these proposals, an information recording region is formed on a film, and photographing information is recorded on the information recording region, so that the information is utilized in correction, trimming, and editing operations, and the like in a print operation.

For example, Jpn. Pat. Appln. KOKAI Publication No. 4-136831 proposes a camera below. That is, when a battery is exchanged during a feeding operation of one frame of a film having one perforation per frame (one photographing frame) after a photographing operation of one frame, the film is moved after the exchange of the battery to detect the closest perforation, and a frame corresponding to the detected perforation is set at a photographing position.

A larger number of perforations are preferably formed in a film since a one-frame feeding operation, a rewind operation, and the like can be stabilized, and a stable operation free from an idle rotation or the like can be obtained. As for the number of perforations when an information recording region is formed on a film, two perforations can be formed per frame even when the information recording region is assured. In consideration of this fact, two perforations are preferably formed per frame since the operation can be stabilized.

However, Jpn. Pat. Appln. KOKAI Publication No. 4-136831 does not describe any method of feeding a film having two perforations per frame.

Furthermore, when a film having two perforations per frame is used in a film feed controller of the camera described in Jpn. Pat. Appln. KOKAI Publication No. 4-136831, the operation is performed as follows.

More specifically, after a photographing frame is exposed, a one-frame feeding operation is performed. (a) in FIG. 20 shows a photographing region and the positions of photographing frames with respect to perforation detection means immediately after a photographing frame Fa is exposed and before the feeding operation is started. In this state, the photographing frame Fa remains set at the photographing region. Photographing frames Fb, Fc, . . . are those to be set at the illustrated positions by the one-frame feeding operation after the photographing operation.

If a battery is removed due to any cause when the film moves to the position illustrated in (b) in FIG. 20, a state illustrated in (c) in FIG. 20 is set if the closest perforation is detected to set a photographing frame at the position of the photographing region. As a result, the photographing frame Fa is undesirably subjected to double exposure.

In this case, the subsequent photographing frames cannot be subjected to exposure at normal film positions. Furthermore, the correspondence between the photographing information recorded on a film and the photographing frames is disturbed.

SUMMARY OF THE INVENTION

It is, therefore, an object of the present invention to provide a new and improved camera capable of properly operating when recovering from power interruption.

It is another object of the present invention to provide a camera which can solve the conventional problems, and can prevent information which is associated with a film, is read from an information recording disk or the like in a film cartridge and is stored in a memory (RAM) or the like in a control circuit arranged in a camera main body, from being lost even when a battery as a main power supply of the camera is exchange.

It is still another object of the present invention to provide a camera which has a film feed controller and uses a film having two perforations per frame, wherein a photographing frame to be subjected to the next photographing operation can be disposed at a normal position with respect to a photographing region even when a power supply is interrupted during a film feeding operation.

According to an aspect of the present invention, there is provided a film feeding apparatus for a camera using a film cartridge which comprises, in a cartridge, a data disk recorded information inherent to a film, and a film having one or two perforations per frame, comprising:

nonvolatile memory means;

writing means for writing information associated with a photographing operation in the nonvolatile memory means;

read-out means for, when a power supply to the camera is interrupted, and thereafter, is recovered, reading out the information associated with the photographing operation from the nonvolatile memory means; and control means for controlling an operation of the camera on the basis of the information read out by the read-out means.

According to another aspect of the present invention, there is provided a camera capable of using a film cartridge, which has a disk-shaped code plate rotatable integrally with a cartridge spool shaft and representing information inherent to a film, and feeds a film leading end portion from the film cartridge, comprising:

driving means for rotating the cartridge spool shaft of the film cartridge;

read means for reading film information from the disk-shaped code plate of the film cartridge loaded in the camera; and nonvolatile memory means for storing the film information read by the read means, wherein when the film cartridge is loaded into the camera, the camera causes the read means to read the film information from the disk-shaped code plate, and causes the nonvolatile memory means to store the film information read out by the read means therein.

According to still another aspect of the present invention, there is provided a camera which comprises a battery as a power supply and can use a film having two perforations per frame, comprising:

feeding means for feeding the film;

film moving amount detection means for detecting a moving amount of the film;

perforation detection means for detecting a perforation of the film;

nonvolatile memory means for storing film feeding information prior to at least a driving operation by the feeding means; and control means for controlling an operation of the camera, wherein when the power supply is interrupted during a feeding operation of the film, the control means determines a position of a next frame to be exposed of the film on the basis of outputs from the nonvolatile memory means, the film moving amount detection means, and the perforation detection means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiments given below, serve to explain the principles of the invention.

FIG. 3 is a top view of principal part of the camera shown in FIG. 2;

FIGS. 4A, 4B, and 4C are views respectively showing "unexposed position", "partial exposed position", and "full exposed position" states as the states of an exposed state indication plate arranged on the bottom surface side of a film cartridge, which is applied to the camera shown in FIG. 1;

FIGS. 5A and 5B are perspective views of the outer appearances of the film cartridge shown in FIG. 2 when they are respectively viewed from the sides of the upper and lower surfaces;

FIG. 6 is a central longitudinal sectional view of the film cartridge shown in FIG. 2;

FIG. 7 is a view showing a state wherein a film in the film cartridge shown in FIG. 2 is fed outside the film cartridge;

FIG. 17 is a flow chart showing an example of processing (i.e., processing upon loading of a battery) executed when a power supply is interrupted during the one-frame wind-up processing, and thereafter, the power supply is recovered;

DETAILED DESCRIPTION OF THE PREFERRED EMBODIMENTS

Figure 1:
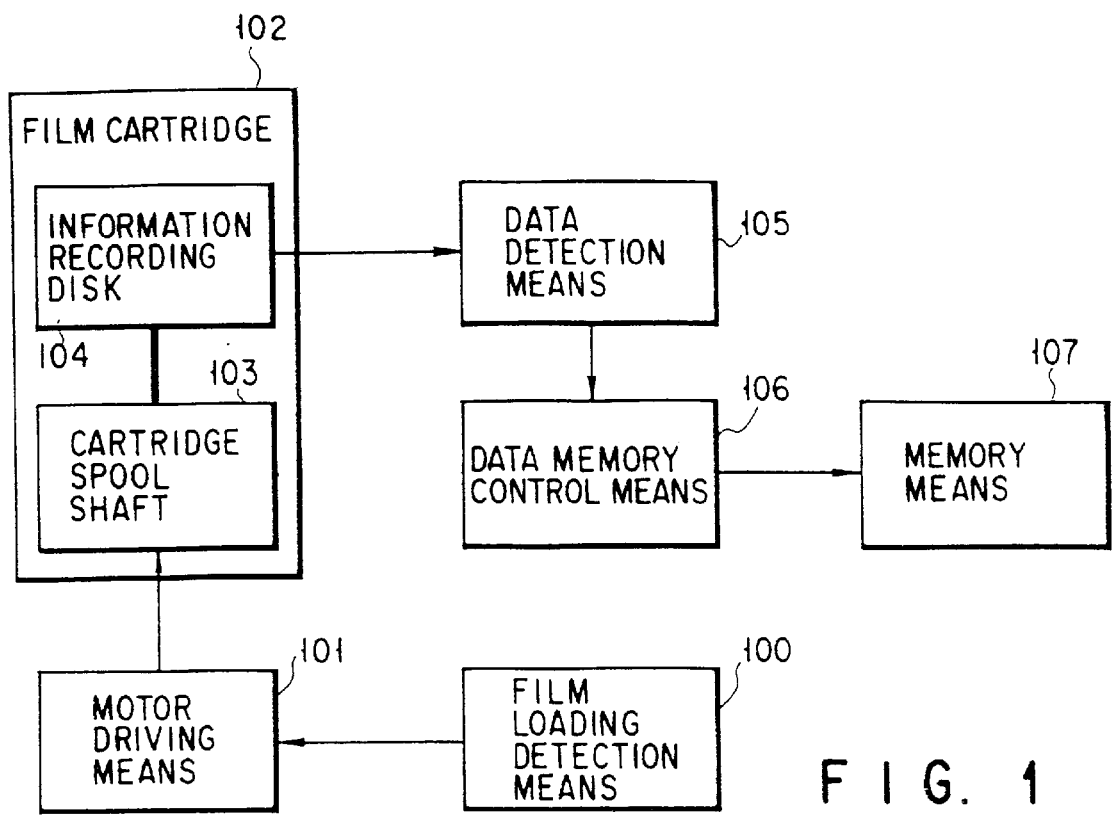
FIG. 1 is a block diagram of a camera according to the first embodiment of the present invention.

Reference will now be made in detail to the presently preferred embodiments of the invention as illustrated in the accompanying drawings, in which like reference characters designate like or corresponding parts throughout the several drawings.

The first embodiment of the present invention will be described hereinafter with reference to the accompanying drawings.

Prior to the description of the first embodiment of the present invention, the principle of a camera according to the first embodiment of the present invention and a film cartridge used in the camera of the present invention will be explained.

More specifically, as shown in FIG. 1, the camera according to the first embodiment of the present invention comprises a film cartridge 102 for storing a film. A cartridge spool shaft 103 around which the film is wound and an information recording disk 104 as a disk-shaped code plate which records film information inherent to the film cartridge 102 are arranged in the film cartridge 102. The information recording disk 104 is rotatable integrally with the cartridge spool shaft 103.

A camera main body includes a film (cartridge) loading detection means 100 for detecting if the film cartridge 102 is loaded, a motor driving means 101 for externally feeding the film from the film cartridge 102 by rotating the cartridge spool shaft 103 in the film cartridge 102 in response to an output signal from the film loading detection means 100, a data detection means 105 as read means for reading film information or the like recorded on the information recording disk 104, which rotates integrally with the cartridge spool shaft 103 rotated by the motor driving means 101, and a memory means 107 as nonvolatile memory means for storing the film information or the like read by the data detection means 105 under the control of a data memory control means 106.

According to this camera, when the film cartridge is loaded into the camera, the leading end portion of the film stored in the film cartridge is initially fed by driving means (motor driving means), and inherent information associated with the film is read from the disk-shaped code plate (information recording disk; data disk) in the film cartridge loaded in the camera main body by the read means (data detection means). The read inherent information associated with the film is stored in the nonvolatile memory means (memory means).

The nonvolatile memory means can hold the contents stored in a RAM in a control means even when a voltage drop occurs at the power supply terminal of the control circuit in the camera main body upon exchange of a power supply battery as a main power supply of the camera.

FIG. 5A shows a perspective view showing the outer appearance of the film cartridge used in the camera of the present invention, and FIG. 5B is a perspective view of the film cartridge when viewed from its bottom surface side. FIG. 6 is a central longitudinal sectional view of the film cartridge, and FIG. 7 is a view showing a state wherein the film stored in the film cartridge is fed from the film cartridge.

The film cartridge comprises a disk-shaped code plate as an information recording disk, which rotates integrally with a cartridge spool shaft arranged at the center of the film cartridge, and records inherent information associated with the film stored in the film cartridge by means of, e.g., coding.

More specifically, as shown in FIGS. 5A and 5B and FIG. 6, a cartridge spool shaft 2 is rotatably axially supported in a film cartridge 1, and a film 6 is stored in the cartridge 1 while being wound around the cartridge spool shaft 2. An upper end portion 2a projecting from the upper end of the film cartridge 1 engages with a fork portion arranged in a camera main body (not shown) when the film cartridge 1 is loaded into the camera main body. A film feed port 5 for externally feeding the film 6 from the interior of the film cartridge 1 is formed along the widthwise direction on the outer circumferential surface side of the film cartridge 1.

Furthermore, as shown in FIG. 6, a disk-shaped code plate 3 as an information recording disk is integrally formed in a flange shape on the upper portion of the cartridge spool shaft 2 in the film cartridge 1. Information associated with the film 6 stored in the film cartridge 1 is recorded in the form of bar code information on the disk-shaped code plate 3. The bar code information on the upper surface of the disk-shaped code plate 3 includes a start bit 4 wider than other bar code patterns, as shown in FIG. 5A.

As shown in FIG. 6, an exposed state indication plate 7 serving as a state indicator and an exposed state indicator, whose display contents change in correspondence with the state of the film 6 stored in the film cartridge 1 is integrally formed in a flange shape on the end portion, at the bottom surface side, of the cartridge spool shaft 2 of the film cartridge 1 in the same manner as the above-mentioned disk-shaped code plate 3. A black-and-white pattern is formed on the surface of the exposed state indication plate 7, as shown in FIG. 5B. By checking the rotation position of the exposed state indication plate 7 in synchronism with the film feeding operation, the exposed state of the film 6 stored in the film cartridge 1 can be discriminated.

As shown in FIG. 7, exposure portions as image frames on which images of respective frames a are forsed are formed on the film 6 stored in the film cartridge 1. The exposure portions are formed in turn like a first-frame exposure portion 13, a second-frame exposure portion 14, a third-frame exposure portion 15, and the like.

On one end portion, in the widthwise direction, of the film 6, perforations 10, 11, 12, and the like, each of which corresponds to one frame, are formed outside the exposure portions (13 to 15) of the respective frames. These perforations 10 to 12 are formed to position the exposure portions (13 to 15) corresponding the frames to a predetermined position of the camera main body side.

Note that the distance, L, between the leading edge of a leader portion 16 as the leading end portion of the film 6 and a frame 17 at the leading end side of the first-frame exposure portion 13 is set to have a predetermined value. In FIG. 7, an arrow A indicates the film feeding direction.

Figure 2:
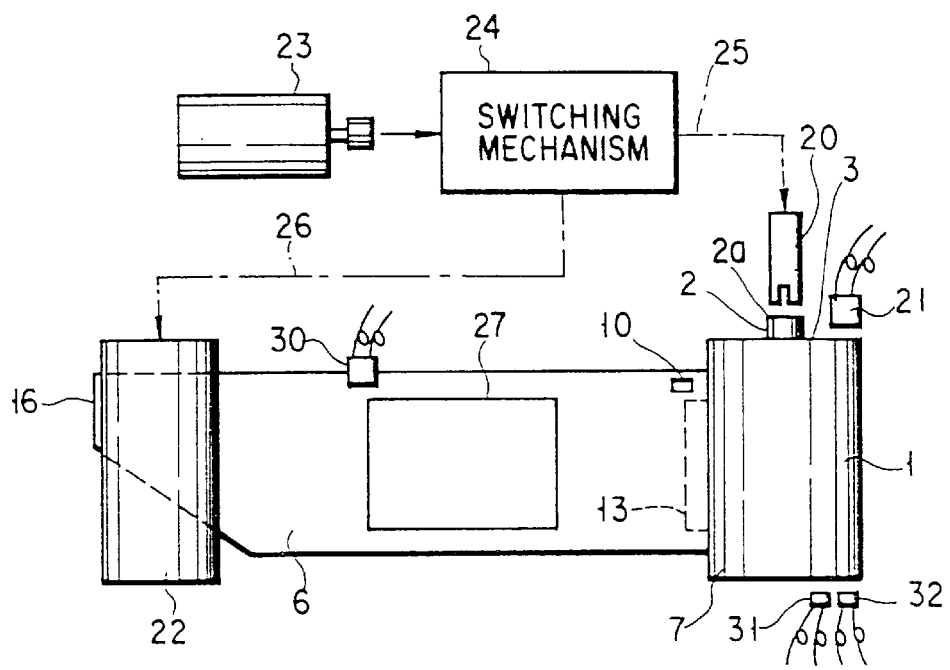
FIG. 2 is a block diagram of the arrangement of principal part of the camera shown in FIG. 1.

FIG. 2 is a block diagram showing the arrangement of principal part of the camera according to the first embodiment of the present invention. FIG. 3 is a top view of the arrangement of principal part of the camera shown in FIG. 2.

As shown in FIG. 2, a film cartridge storage chamber (not shown) in the camera main body has a fork portion 20 which projects from the upper or lower inner bottom surface of the storage chamber. When the film cartridge 1 is loaded into the film cartridge storage chamber, the fork portion 20 engages with the upper end portion 2a of the cartridge spool shaft 2 of the film cartridge 1.

On the other hand, a photoreflector (PR) 21 serving as the read means or data read means for reading information inherent to the film and recorded on the disk-shaped code plate 3, is disposed on the camera main body side at a position facing the bar code pattern surface, on which the film information is recorded, of the disk-shaped code plate 3 in the film cartridge 1.

Photointerrupters (PIs) 31 and 32 serving as state detection means which reads the display contents of the exposed state of the film 6 stored in the film cartridge 1, which state is indicated by the pattern on the exposed state indication plate 7, and detects the state of the exposed state indication plate 7 as the state indicator are disposed on the camera main body side at a position facing the black-and-white pattern surface of the exposed state indication plate 7 arranged at the bottom surface side of the film cartridge 1.

On the other hand, a photographing aperture 27 is formed in a rear portion along the photographing optical axis in the middle of the camera main body. The photographing aperture 27 has an area corresponding to the exposure portion (e.g., the first-frame exposure portion 13) for one frame on the film 6. In the other end portion of the camera main body at the side opposite to the film cartridge storage chamber to sandwich the photographing aperture 27 therebetween, a film take-up chamber (not shown) is arranged. In this film take-up chamber, a take-up spool 22 for taking up a portion of film 6, which is fed from the film cartridge 1 and exposed, is rotatably and axially supported.

Near the photographing aperture 27, a film feeding motor 23 serving as a driving source and driving means for performing an initial feeding and wind-up or rewind operations of the film 6 in the film cartridge 1, is arranged. The transmission direction of the driving force of the film feeding motor 23 can be switched by a switching mechanism in correspondence with the rotation direction of the motor 23. Furthermore, the driving force of the film feeding motor 23 is transmitted to the fork portion 20 and the cartridge spool shaft 2, or the spool 22 via a driving force transmission mechanism 25 or 26. Therefore, by the driving force of the film feeding motor 23, the initial feeding and wind-up or rewind operations of the film 6 in the film cartridge 1 are attained.

On the other hand, a photointerrupter 30 as perforation detection means is disposed at a position facing the perforation 10 formed on one end portion, in the widthwise direction, of the film 6 and near the film feeding path (not shown) of the camera main body side. As shown in FIG. 3, a light-emitting portion 30a and a light-receiving portion 30b of the photo-interrupter 30 are disposed to oppose each other to sandwich the film 6 therebetween.

When the film 6 is fed, the photointerrupter 30 detects the feed amount of the film 6, thus realizing the feeding operation for one frame of the film 6. More specifically, in feeding the film 6 for a necessary amount upon execution of the initial feeding operation of the film 6 from the film cartridge 1, which is executed after the film cartridge 1 is loaded into the camera main body or the wind-up operation of the film 6 after a photographing operation, when one of the perforations 10 to 12 and the like corresponding to the frames is detected by the photointerrupter 30, the driving operation of the film feeding motor 23 is inhibited to stop the film feeding operation.

The film feeding operation in the camera of the first embodiment with the above arrangement will be briefly described below with reference to FIGS. 2 and 3.

When the film cartridge 1 is loaded into the camera main body (not shown), and a rear cover detection switch (to be described later) or the like, as loading detection means for detecting the loading of the film cartridge 1, detects that the film cartridge 1 is loaded in the camera main body by performing an operation for, e.g., closing the rear cover of the camera main body, the film feeding motor 23 rotates in the first direction as the initial feeding direction of the film 6 in the film cartridge 1. Thus, the driving force of the film feeding motor 23 is transmitted to the fork portion 20 via a switching mechanism 24 and the driving force transmission mechanism 25, thereby rotating the cartridge spool shaft 2 of the film cartridge 1 in the clockwise (CW) direction in FIG. 3.

The driving force of the film feeding motor 23 is also transmitted to the take-up spool 22 in the camera main body via the switching mechanism 24 and the transmission mechanism 26, and the take-up spool 22 is also rotated in the clockwise (CW) direction in FIG. 3.

Therefore, the cartridge spool shaft 2, around which the film 6 is wound, in the film cartridge 1 loaded in the film cartridge storage chamber is rotated in the CW direction by the rotation driving force, in the first direction, of the film feeding motor 23, thereby feeding the film 6 from the film cartridge 1.

When a leader portion 16 of the film 6 is wound around the take-up spool 22 arranged in the film take-up chamber in the camera main body, since the take-up spool 22 is rotated in the CW direction by the rotation driving force, in the first direction, of the film feeding motor 23 as in the cartridge spool shaft 2, the film 6 is taken up by the take-up spool 22, and a film wind-up operation is attained.

The film take-up speed upon rotation of the take-up spool 22 is set to be higher than the film feeding speed upon rotation of the fork portion 20 by the switching mechanism 24 and the driving force transmission mechanisms 25 and 26. Therefore, after the film 6 in the film cartridge 1 is wound around the take-up spool 22 in the camera main body, the film 6 rotates the cartridge spool shaft 2, the fork portion 20, and the transmission mechanism 25 at a speed higher than the driving speed of the film feeding motor 23. In this case, since the transmission mechanism 25 is set to perform an idle rotation with respect to the rotation driving force in the CW direction, any film feeding speed difference between the take-up spool 22 and cartridge spool shaft 2 during the film wind-up operation can be absorbed.

On the other hand, when the film 6 stored in the film cartridge 1 is all wound up by the take-up spool 22 side in the camera main body after being exposed by photographing operations, and the last frame of the film 6 is detected, the film feeding motor 23 is rotated in the second direction as a film rewind direction. At this time, the driving force of the film 5 feeding motor 23 is transmitted to the fork portion 20 via the switching mechanism 24 and the transmission mechanism 25 to rotate the cartridge spool shaft 2 in the counterclockwise (CCW) direction. In this case, since transmission of the driving force between the take-up spool 22 and the transmission mechanism 26 is stopped, the take-up spool 22 is free to idle.

Therefore, the exposed film 6 wound around the take-up spool 22, which is axially supported in the film take-up chamber in the camera main body, is rewound into the film cartridge 1.

FIGS. 4A to 4C respectively show the states of the exposed state indication plate 7 provided to the bottom surface side of the film cartridge 1. FIGS. 4A, 4B, and 4C respectively show the "unexposed position", "partial exposed position", and "full exposed position" states of the exposed state indication plate 7.

As shown in FIG. 4A, when the stored film 6 is not used, i.e., is not exposed at all, that is, when a new film cartridge 1 is loaded into the film cartridge storage chamber in the camera main body and the film 6 is completely stored in the film cartridge 1, the exposed state indication plate 7 is located at the "unexposed position". More specifically, "black" and "white" display patterns of the exposed state indication plate 7 are detected at positions facing the photointerrupters 31 and 32 disposed on the camera main body side.

As shown in FIG. 4B, when a film cartridge 1 storing a film 6, which was exposed halfway through and was rewound, is loaded into the film cartridge storage chamber in the camera main body, and the film 6 is completely stored in the film cartridge 1, the exposed state indication plate 7 is located at the "partial exposed position". More specifically, "black" and "black" display patterns of the exposed state indication plate 7 are detected at the positions facing the photointerrupters 31 and 32 disposed on the camera main body side.

As shown in FIG. 4C, when a film cartridge 1 storing a film 6, all the frames of which were already photographed, i.e., exposed, is loaded into the film cartridge storage chamber in the camera main body, and the film 6 is completely stored in the film cartridge 1, the exposed state indication plate 7 is located at the "full exposed position". More specifically, "white" and "black" display patterns of the exposed state indication plate 7 are detected at the positions facing the photointerrupters 31 and 32 disposed on the camera main body side.

Figure 8:
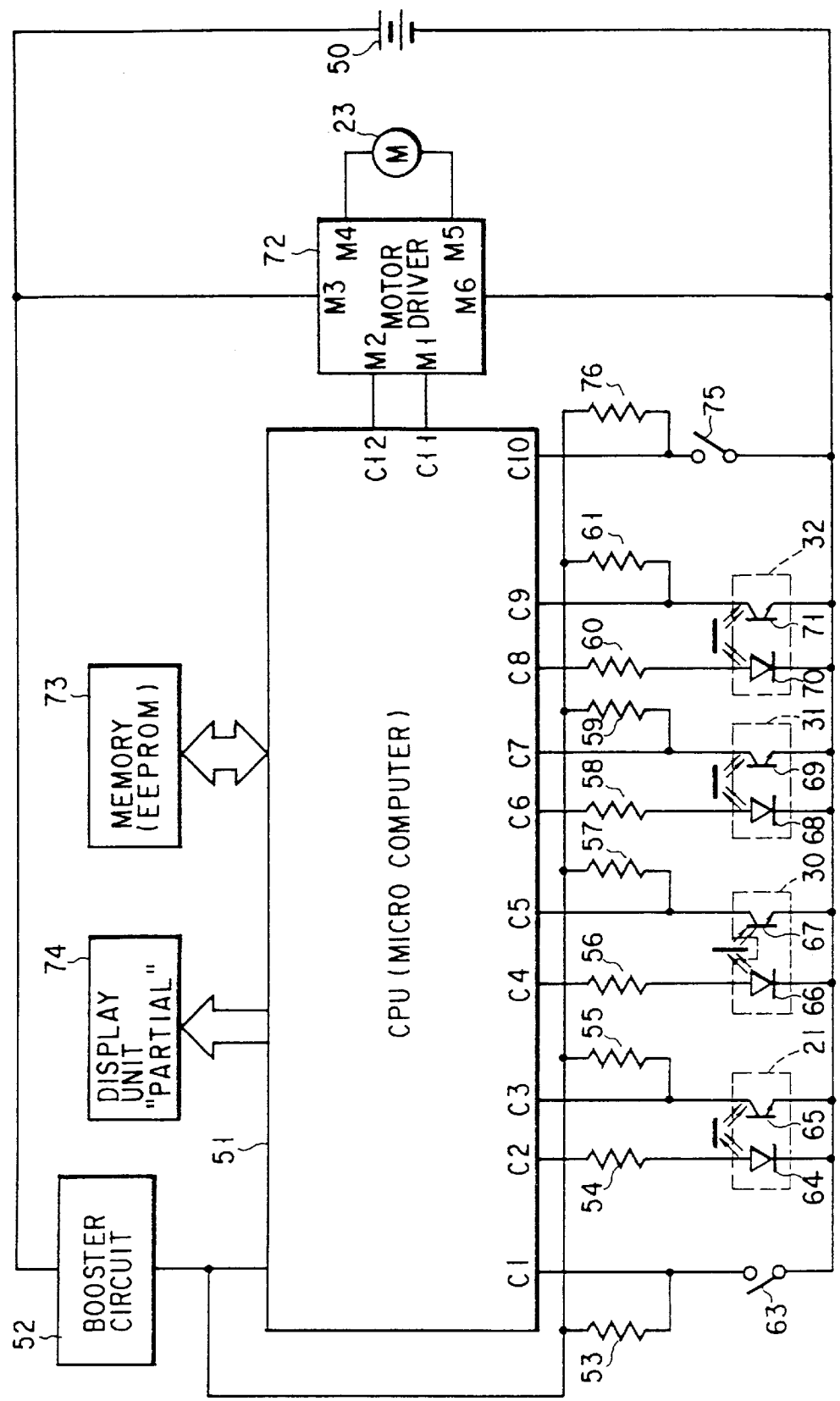
FIG. 8 is a circuit diagram showing a control circuit in the camera shown in FIG. 1.

FIG. 8 is a circuit diagram showing a control circuit in the camera of the first embodiment. The control circuit will be explained below along the flow of signals.

As shown in FIG. 8, the power supply voltage of a power supply battery 50 is boosted to a predetermined constant voltage by a booster circuit 52, and is applied to a CPU (microcomputer) 51 for controlling the entire camera, and the like. The CPU 51 has a plurality of input/output terminals C1 to C12. The input terminal C1 is electrically connected to a rear cover detection switch 63 as loading detection means, which is arranged in the rear surface portion of the camera main body, and detects the opening/closing state of a rear cover (not shown) through which the film cartridge 1 is loaded/unloaded so as to detect the loading of the film cartridge 1. The input terminal C1 is pulled up since it is connected to the output terminal of the booster circuit 52 via a pull-up resistor 53 (the same applies to other terminals). The rear cover detection switch 63 is turned on when the rear cover is opened, and is turned off when the rear cover is closed.

The output terminal C2 and the input terminal C3 of the CPU 51 are electrically connected to the photoreflector 21 which is arranged for reading information inherent to a film in the form of bar code information or the like recorded on the disk-shaped code plate 3 in the film cartridge 1. The anode of a light-emitting diode 64 in the photoreflector 21 is electrically connected to the output terminal C2 via a current limiting resistor 54. On the other hand, the collector of a phototransistor 65 in the photoreflector 21 is electrically connected to the input terminal C3, and is pulled up via a pull-up resistor 55.

Furthermore, the output terminal C4 and the input terminal C5 of the CPU 51 are electrically connected to the photointerrupter 30 which is arranged for detecting the film feeding amount and comprises the light-emitting portion 30a and the light-receiving portion 30b. The anode of a light-emitting diode 66 in the photointerrupter 30 is electrically connected to the output terminal C4 via a current limiting resistor 56. The collector of a phototransistor 67 in the photo-interrupter 30 is electrically connected to the input terminal C5, and is pulled up via a pull-up resistor 57.

The output terminal C6 and the input terminal C7, and the output terminal CB and the input terminal C9 of the CPU 51 are respectively electrically connected to the photointerrupters 31 and 32 for reading information from the exposed state indication plate 7, which has been described above with reference to FIGS. 4A to 4C. The anodes of photodiodes 68 and 70 in the photointerrupters 31 and 32 are electrically connected to the output terminals C6 and C8 via current limiting resistors 58 and 60, respectively. The collectors of phototransistors 69 and 71 in the photointerrupters 31 and 32 are electrically connected to the input terminals C7 and C9, and are pulled up via pull-up resistors 59 and 61, respectively.

Note that when the display patterns, facing the photointerrupters 31 and 32, of the exposed state indication plate 7 are "white", the phototransistors 69 and 71 are turned on and "L" (Low) level signals are input to the input terminals C7 and C9.

When the display patterns, facing the photointerrupters 31 and 32, of the exposed state indication plate 7 are "black", the phototransistors 69 and 71 are turned off and "H" (High) level signals are input to the input terminals C7 and C9.

Furthermore, the input terminal C10 of the CPU 51 is electrically connected to a film cartridge detection switch (SW) 75, and is pulled up via a pull-up resistor 76. When the film cartridge 1 is loaded in the camera main body, the film cartridge detection SW 75 is turned off, and an "H"-level signal is input to the input terminal C10; when no film cartridge 1 is loaded in the camera main body, the film cartridge detection SW 75 is turned on, and an "L"-level signal is input to the input terminal C10.

The output terminals C11 and C12 of the CPU 51 are connected to input terminals M1 and M2 of a motor driver 72 for driving the film feeding motor 23, and output signals for controlling the motor driver 72. Output terminals M4 and M5 of the motor driver 72 are connected to the input/output terminals of the film feeding motor 23, and terminals M3 and M6 of the film motor driver 72 are connected to the + (plus) side terminal and the − (minus) side terminal of the power supply battery 50.

The voltage levels, i.e., "L"- or "H"-level signals, at the output terminals C11 and C12 of the CPU 51, and the control state of the film feeding motor 23 are set, as shown in Table 1 below.

TABLE 1

| Control Signal | | Output State | | |
| --- | --- | --- | --- | --- |
| C11 | C12 | M4 | M5 | Motor State |
| H | H | Hiz | HiZ | OFF |
| L | H | + | − | Driving in First Direction |
| H | L | − | + | Driving in Second Direction |
| L | L | − | − | Short Brake |

In Table 1, "HiZ" represents a high-impedance state.

On the other hand, a control circuit arranged in the camera main body comprises a memory 73 as nonvolatile memory means such as an EEPROM for storing various kinds of data such as film information and the like, and the memory 73 is electrically connected to the CPU 51. The memory 73 stores information inherent to a film, which is read from the disk-shaped code plate 3 or the exposed state indication plate 7 of the film cartridge 1. The memory 73 comprises a nonvolatile memory (EEPROM) or the like so as not to lose stored data such as information inherent to a film due to a voltage drop at the power supply terminal when the power supply battery 50 is removed from the control circuit of the camera upon exchange of the power supply battery 50 which is used up.

Furthermore, the CPU 51 is electrically connected to a display unit 74 comprising, e.g., an LCD (liquid crystal panel) or the like, which is disposed on the outer surface of the camera main body, and the display unit 74 displays information inherent to a film, and the like.

Figure 9:
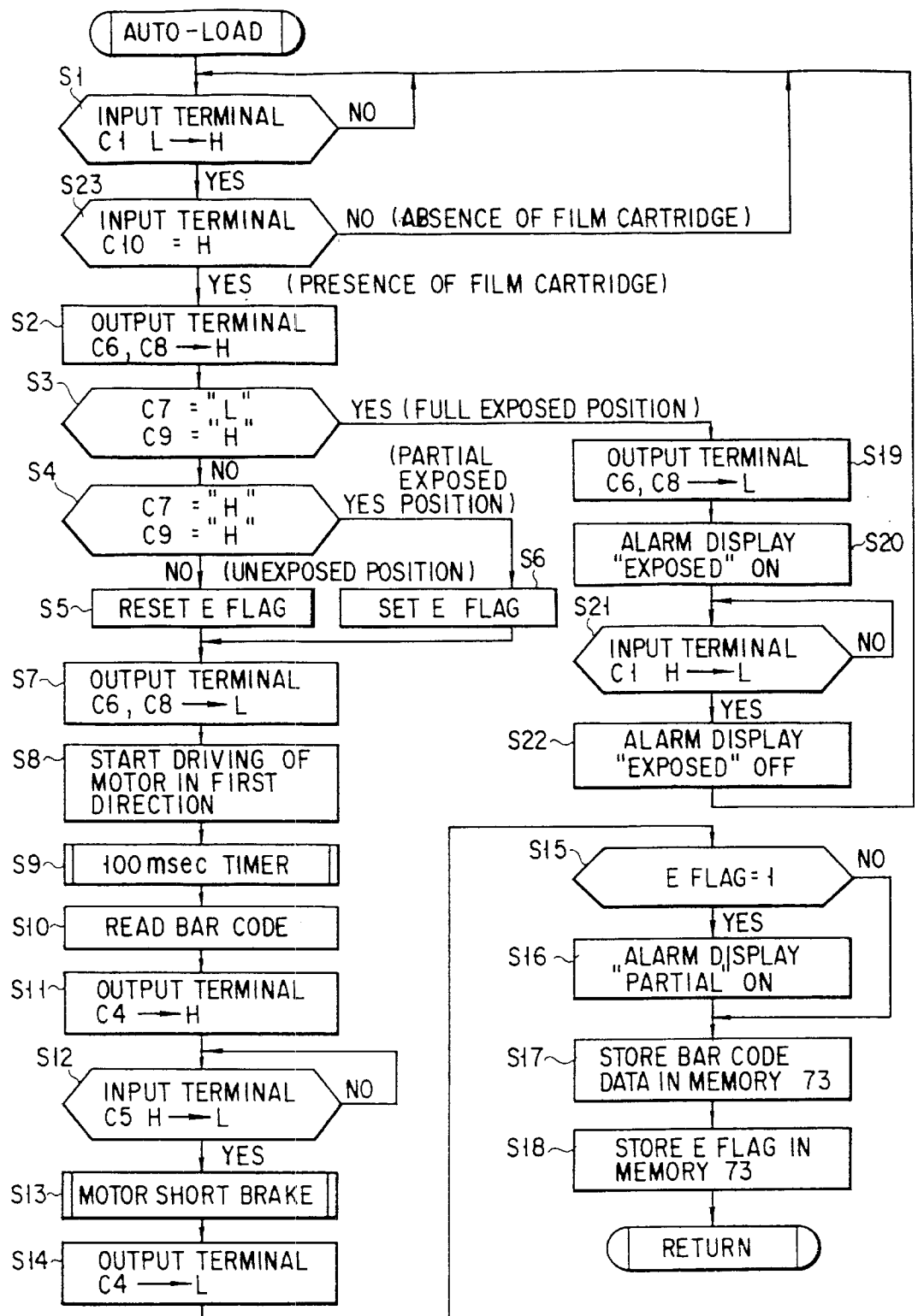
FIG. 9 is a flow chart showing the operation sequence from a film loading operation to an automatic film feeding operation in the camera shown in FIG. 1.
Figure 10:
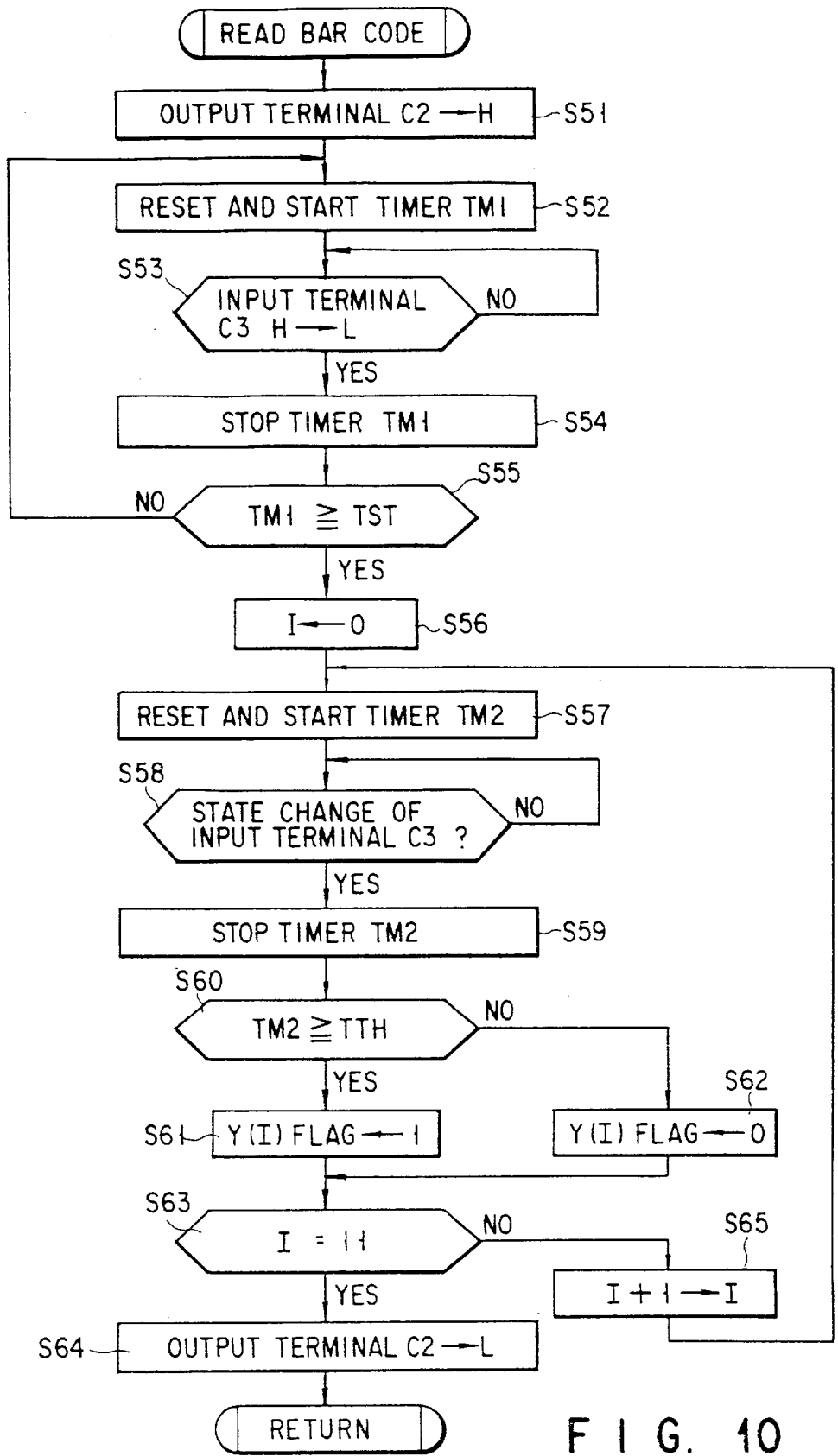
FIG. 10 is a flow chart showing the sequence for reading film information from a disk-shaped code plate arranged in the film cartridge for the camera shown in FIG. 1.

FIGS. 9 and 10 are flow charts showing the operation of the camera of the first embodiment, i.e., the operations executed when the film cartridge 1 is loaded into the camera main body, it is detected that the rear cover of the camera main body is closed, film information in the form of bar code information on the disk-shaped code plate 3, the exposed state indication plate 7, and the like of the film cartridge 1 is read, and an automatic feeding (auto-load) operation such as an initial feeding operation, a wind-up operation, and the like of the film 6 is performed. FIG. 9 shows the film automatic feeding (auto-load) operation, and FIG. 10 shows the bar code reading operation of, e.g., film information. The operation of the camera according to the first embodiment will be described below with reference to the flow charts in FIGS. 9 and 10.

As shown in FIG. 9, in order to perform the auto-load operation of the film 6 from the film cartridge 1, the CPU 51 monitors the input signal at the input terminal C1 in step S1. When the input signal at the input terminal C1 changes from an "L"-level signal to an "H"-level signal, the CPU 51 determines that the rear cover of the camera main body is closed, and the flow advances to step S23. Note that the CPU 51 repeats the processing in step S1 until the input signal at the input terminal C1 changes from an "L"-level signal to an "H"-level signal.

It is checked in step S23 if the film cartridge 1 is loaded in the camera main body 1. More specifically, the film cartridge detection SW 75 connected to the input terminal C10 of the CPU 51 detects the film cartridge 1 in the camera main body. If it is determined that the film cartridge 1 is loaded in the camera main body, the film cartridge detection SW 75 is turned off, and an "H"-level signal is input to the input terminal C10. Thus, the control of the CPU 51 advances to step S2.

On the other hand, if it is determined that the film cartridge 1 is not loaded in the camera main body, the film cartridge detection SW 75 is turned on, and an "L"-level signal is input to the input terminal C10. Thus, the control of the CPU 51 returns to step S1.

In step S2, the CPU 51 outputs "H"-level signals from the output terminals C6 and C8 to enable the photodiodes 68 and 70 in the photointerrupters 31 and 32, thus setting a preparation state in which information on the exposed information indication plate 7 in the film cartridge 1 can be read. Then, the control of the CPU 51 advances to step S3.

In step S3, the CPU 51 monitors the states of the input terminals C7 and C9. If the CPU 51 determines in step S3 that the states indicate the input terminal C7 is at "L" level and the input terminal C9 is at "H" level, it detects that the bar code information on the exposed state indication plate 7 in the film cartridge 1, i.e., the display patterns on the exposed state indication plate 7 are "white" and "black" display patterns. Since this state corresponds to the position described above with reference to FIG. 4C, i.e., the "full exposed position", the control of the CPU 51 advances to step S19. In step S19, the CPU 51 sets the output terminals C6 and C8 at "L" level to disable the photodiodes 68 and 70. In step S20, the CPU 51 supplies a control signal to the display unit 74 to turn on a display of a message "EXPOSED", i.e., an alarm message indicating that all the frames of the film 6 in the film cartridge 1 are exposed.

The flow then advances to step S21, and the CPU 51 monitors the input terminal C1. If the CPU 51 determines in step S21 that the input signal at the input terminal C1 changes from an "H"-level signal to an "L"-level signal, the CPU 51 determines that the rear cover of the camera main body is opened, and the flow advances to step S22. In step S22, the CPU 51 controls the display unit 74 to turn off the alarm message display "EXPOSED", and the flow returns to step S1. Note that the CPU 51 repeats the processing in step S21 until the input signal at the input terminal C1 changes from an "H"-level signal to an "L"-level signal.

On the other hand, in step S3 above, the CPU 51 monitors the states of the input terminals C7 and C9. If the CPU 51 determines in step S3 that the states do not indicate the input terminal C7 is at "L" level and the input terminal C9 is at "H" level, the flow advances to step S4. If the CPU 51 determines in step S4 that both the input terminals C7 and C9 are at "H" level, it detects that the bar code information on the exposed state indication plate 7 in the film cartridge 1, i.e., the display patterns on the exposed state indication plate 7 are "black" and "black" display patterns. Since this state corresponds to the position described above with reference to FIG. 4B, i.e., the "partial exposed position", the control of the CPU 51 advances to step S6. In step S6, the CPU 51 sets an E flag, and the flow advances to step S7.

If the CPU 51 determines in step S4 that the states do not indicate the input terminal C7 is at "H" level and the input terminal C9 is at "H" level, it detects that the bar code information on the exposed state indication plate 7 in the film cartridge 1, i.e., the display patterns on the exposed state indication plate 7 are "white" and "white" display patterns. Since this state corresponds to the position described above with reference to FIG. 4A, i.e., the "unexposed position", the control of the CPU 51 advances to step S5. In step S5, the CPU 51 resets the E flag, and the flow advances to step S7.

In step S7, the CPU 51 sets both the output terminals C6 and C8 at "L" level to disable the photodiodes 68 and 70, and the flow then advances to step S8.

In step S8, the CPU 51 respectively sets the output terminals C11 and C12 at "L" level and "H" level to start rotation of the film feeding motor 23 in the initial feeding direction of the film 6 as the first direction, and the flow then advances to step S9. In step S9, the CPU 51 starts the operation of a 100-msec timer. Note that this timer sets the waiting time until the rotational speed of the film feeding motor 23 reaches a steady state, i.e., sets the time required for reading out information so as to assure reading precision in the film information reading sequence (see FIG. 10 for details) of the disk-shaped code plate 3 in the film cartridge 1 in the next step S10. More specifically, when the reading operation of the bar code information such as film information on the disk-shaped code plate 3 is started before the film feeding motor 23 reaches a steady rotational speed, the information reading precision may be impaired. For this reason, in order to assure given information reading precision, the timer is used.

In step S10, the bar code information is read. The bar code reading sequence will be described in detail below with reference to the flow chart in FIG. 10.

As shown in FIG. 10, upon execution of the bar code reading operation of, e.g., the film information on the disk-shaped code plate 3, the CPU 51 sets the output signal from the output terminal C2 at "H" level in step S51 to enable (ON) the light-emitting diode 64 in the photoreflector 21, so that the bar code information such as information inherent to a film on the disk-shaped code plate 3 can be read. Thereafter, the flow advances to step S52.

In steps S52 to S55, the bar code reading operation of, e.g., the film information on the disk-shaped code plate 3 is performed. In this case, as shown in FIG. 5A above, the bar code information on the disk-shaped code plate 3 includes the start bit 4. The pattern of the start bit 4 is wider than the bit patterns of other bar codes on the disk-shaped code plate 3, and is painted in black. The steps of reading the start bit 4 in distinction from other bits correspond to the processing in steps S52 to S55.

In step S52, the CPU 51 resets and starts a timer TM1. In step S53, the CPU 51 monitors the input terminal C3. If the CPU 51 determines in step S53 that the input signal at the input terminal C3 changes from an "H"-level signal to an "L"-level signal, the flow advances to step S54. In step S54, the CPU 51 stops the timer TM1. In step S55, the CPU 51 compares the count value of the timer TM1 with a predetermined value TST.

If the CPU 51 determines in step S55 that the count value of the timer TM1 and the predetermined value TST satisfy TM1≧TST, it determines that the detected bar code information is the start bit 4, and the flow advances to step S56.

On the other hand, if the CPU 51 determines in step S55 that the count value of the timer TM1 and the predetermined value TST satisfy TM1<TST (not TM1≧TST), it determines that the detected bar code information is not the start bit 4 but is a normal information bit, and the flow returns to step S52.

As described above, the control of the CPU 51 advances to step S56 if it is determined in step S55 that TM1≧TST. In a sequence in steps S56 to S63 and in step S65, the bar code information representing the information inherent to a film on the disk-shaped code plate 3 is actually read.

More specifically, the bar code pattern on the disk-shaped code plate 3 arranged in the film cartridge 1, which is applied to the camera of the first embodiment, is formed, so that 12 bit patterns alternately appear like "white", "black", "white", . . . , after the start bit 4. These bit patterns include two different patterns, i.e., wide and narrow patterns, in addition to "black" and "white" patterns. By reading these bit patterns in steps S56 to S63 and in step S65, the pulse widths are discriminated.

In step S56, the CPU 51 sets a loop counter I to be "0". In step S56, the CPU 51 resets and starts a timer TM2. In step S58, the CPU 51 monitors the state of the input terminal C3. If the CPU 51 determines in step S58 that the state of the input terminal C3 changes, the flow advances to step S59. In step S59, the CPU 51 stops the count operation of the timer TM2.

In step S60, the CPU 51 compares the count value of the timer TM2 and a predetermined time value TTH. If it is determined that the count value of the timer TM2 and the predetermined time value TTH satisfy TM2≧TTH, a long pulse width is determined, and the flow advances to step S61. In step S61, the CPU 51 stores "1" in a flag Y(I), and the flow advances to step S63.

On the other hand, if the CPU 51 determines in step S60 that the count value of the timer TM2 and the predetermined time value TTH satisfy TM2<TTH (not TM2≧TTH), a short pulse width is determined, and the flow advances to step S62. In step S62, the CPU 51 stores "0" in the flag Y(I), and the flow advances to step S63.

If the CPU 51 determines in step S63 that I≠11, the flow advances to step S65. In step S65, the CPU 51 adds "1" to I (I+1), and the flow returns to step S57. The CPU 51 reads 12 bit patterns after the start bit 4 by executing a series of sequence operations in steps S57 to S63 and step S65, and stores information inherent to the film in the flags Y(I), i.e., flags Y(0) to Y(11).

If the CPU 51 determines in step S63 that I≠11, the flow advances to step S65. In step S65, the CPU 51 adds "1" to I (I+1), and the flow returns to step S57. The CPU 51 reads 12 bit patterns after the start bit 4 by executing a series of sequence in steps S57 to S63 and step S65, and stores information inherent to the film in the flags Y(I), i.e., flags Y(0) to Y(11).

On the other hand, if the CPU 51 determines in step S63 that I=11, the flow advances to step S64. In step S64, the CPU 51 sets the output signal from the output terminal C2 at "L" level to disable (OFF) the light-emitting diode 64, thus ending a series of bar code reading operations (RETURN). Then, the flow advances to step S11 in FIG. 9 above.

As shown in FIG. 9, in step S11, the CPU 51 sets the output signal from the output terminal C4 at "H" level to enable (ON) the light-emitting diode 66 in the photointerrupter 30 to set a preparation state for detection of the perforations 10 formed on the film 6. Thereafter, the flow advances to step S12. In step S12, the CPU 51 monitors the state of the input signal at the input terminal C5. If the CPU 51 determines in step S12 that the input signal at the input terminal C5 changes from an "H"-level signal to an "L"-level signal, this means that a perforation 10 is detected, and the flow advances to step S13 to short-brake the motor.

More specifically, in step S13, the CPU 51 sets the output signals from both the output terminals C11 and C12 at "L" level to set the film feeding motor 23 in a short-brake state, and holds this state for 100 msec. Thereafter, the CPU 51 turns off the film feeding motor 23, and the flow then advances to step S14. In step S14, the CPU 51 sets the output signal from the output terminal C4 at "L" level to disable the light-emitting diode 66 in the photointerrupter 30.

In step S15, the CPU 51 checks the state of the E flag. If the CPU 51 determines in step S15 that the E flag=1, i.e., the E flag is set, the flow advances to step S16. In step S16, the CPU 51 supplies a control signal to the display unit 74 to display an alarm message "PARTIAL" or the like, and the flow then advances to step S17. Note that the alarm message displayed on the display unit 74 means that a film cartridge 1 storing a film 6 which has been only partially exposed is loaded in the camera main body.

In step S17, the CPU 51 accesses the memory 73, so that data stored in the flags Y(0) to Y(11) as bar code data such as film information on the disk-shaped code plate 3 read in step S10 above are stored in the memory 73. In step S18, the CPU 51 stores the contents of the E flag in the memory 73, thus ending a series of film auto-load sequence operations (RETURN).

In the sequence of the first embodiment, upon completion of the initial feeding operation of the film 6 after the film cartridge 1 is loaded in the camera main body, bar code data, which records, e.g., film information on the disk-shaped code plate 3 in the film cartridge 1, is stored in the memory 73 of the CPU 51. In contrast to this, as a modification of the first embodiment, immediately after the bar code data on the disk-shaped code plate 3 is read, i.e., immediately after the processing in step S10, the bar code data on the disk-shaped code plate 3 may be stored in the memory 73 of the CPU 51.

Figure 11:
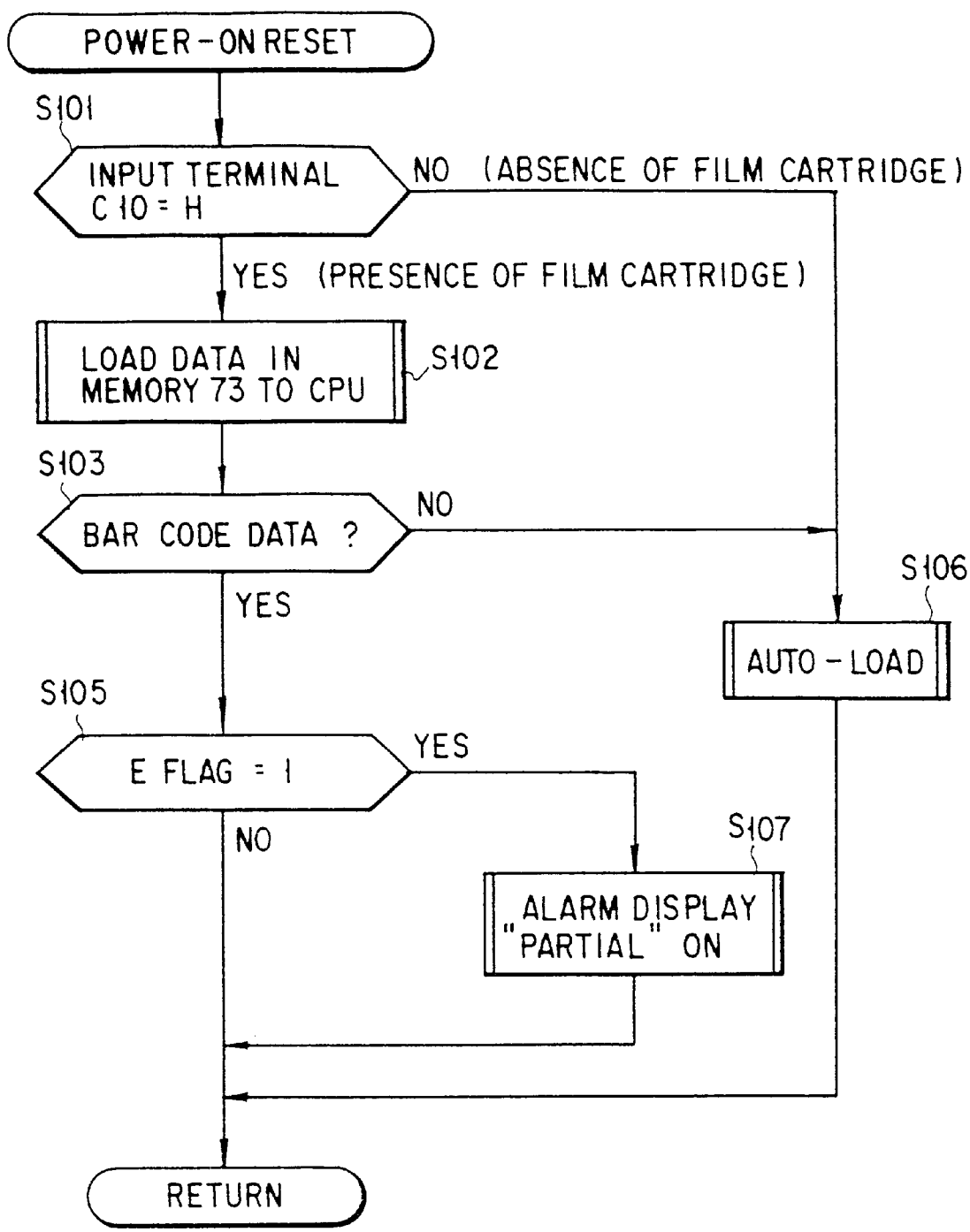
FIG. 11 is a flow chart showing the sequence upon exchange of a battery in the camera shown in FIG. 1.

FIG. 11 is a flow chart showing the power-ON reset sequence of the camera according to the first embodiment, i.e., the operation sequence executed when a new battery is loaded into the camera main body upon exchange of the power supply battery as the main power supply of the camera.

As shown in FIG. 11, the CPU 51 monitors the input signal at the input terminal C10 in step S101. If the CPU 51 determines in step S101 that the input signal at the input terminal C10 is an "L"-level signal, it indicates that no film cartridge 1 is loaded in the camera main body, and the flow advances to step S106. In step S106, the CPU 51 performs a film auto-load operation, and ends the sequence (RETURN).

On the other hand, if the CPU 51 determines in step S101 that the input signal at the input terminal C10 is an "H"-level signal, since the film cartridge 1 is loaded in the camera main body, the flow advances to step S102. In step S102, the CPU 51 accesses the memory 73 to transfer (load) data such as film information stored in the memory 73 into the CPU 51.

If it is determined in step S103 that the data such as film information transferred into the CPU 51 in step S102 includes the bar code data Y(0) to Y(11), the CPU 51 determines that the film auto-load operation has finished, and the flow advances to step S104.

On the other hand, if it is determined in step S103 that all the bar code data Y(0) to Y(11) in the data such as film information transferred into the CPU 51 are "0", the CPU 51 determines that the film auto-load operation is not performed yet, and the flow advances to step S106. In step S106, the CPU 51 performs the film auto-load operation, and ends the sequence (RETURN).

In the first embodiment, although not described, after the photographed film is rewound into the film cartridge, since the bar code data Y(0) to Y(11) are reset, all the bar code data at that time are "0". Therefore, when it is determined in step S103 that all the bar code data Y(0) to Y(11) are "0", the following two cases are possible.

(1) A film cartridge into which a film is completely rewound is loaded in the camera main body.

(2) After a film cartridge that stores an unused film is loaded in the camera main body in a state wherein the power supply battery is removed from the camera main body to exchange the battery, a new battery is loaded in the camera main body.

In either of the cases (1) and (2), the flow advances to step S106, and the CPU 51 performs a film auto-load operation.

If it is determined in step S103 that the data transferred to the CPU 51 includes the bar code data Y(0) to Y(11), the CPU 51 checks the E flag as data transferred from the memory 73 to the CPU 51 in step S105. If the E flag=1, the CPU 51 communicates with the display unit 74 to display an alarm message "PARTIAL" or the like. If the E flag=0, the CPU 51 ends a series of sequence operations (RETURN).

As described above, according to the first embodiment, film information or the like on the disk-shaped code plate 3 arranged in the film cartridge 1 is stored in the memory 73 as the nonvolatile memory means comprising, e.g., an EEPROM in the control circuit of the camera main body. For this reason, when the power supply battery 50 is removed from the control circuit of the camera upon exchange of the power supply battery 50 which is used up, the data such as film information read from the disk-shaped code plate 3 and stored in the memory 73 can be prevented from being lost due to a voltage drop.

Therefore, when a new battery is loaded in the camera main body upon exchange of the battery, the data such as film information need not be read from the disk-shaped code plate 3 again, thus further simplifying the operation sequence of the camera.

According to the first embodiment, the following arrangements are obtained:

(1) A camera which can use a film cartridge having a spool around which a film is wound, and a rotatable information recording disk on an outer surface thereof, comprising:

loading detection means for detecting loading of the film cartridge into the camera;

driving means for rotating the spool in the film cartridge in response to an output signal from the loading detection means;

data read means for reading data from the information recording disk which is rotated by the driving means; and nonvolatile memory means for storing the data read by the data read means even after a main power supply of the camera is removed.

(2) A camera which can use a film cartridge having an exposed state indicator for indicating an exposed state of a film stored therein on an outer surface thereof, comprising:

loading detection means for detecting loading of the film cartridge into the camera;

state detection means for detecting a state of the exposed state indicator; and nonvolatile memory means for storing data read by the state detection means even when a main power supply of the camera is removed.

As described above, according to the first embodiment, since information associated with a film read from a disk-shaped code plate or the like as an information recording disk arranged in a film cartridge is stored in nonvolatile memory means comprising, e.g., an EEPROM in the control circuit in the camera main body, a camera which can prevent the data such as film information from being lost due to a voltage drop at the power supply terminal even when the battery as the main power supply of the camera is exchanged can be provided.

The second embodiment of the present invention will be described below with reference to the accompanying drawings.

Figure 12:
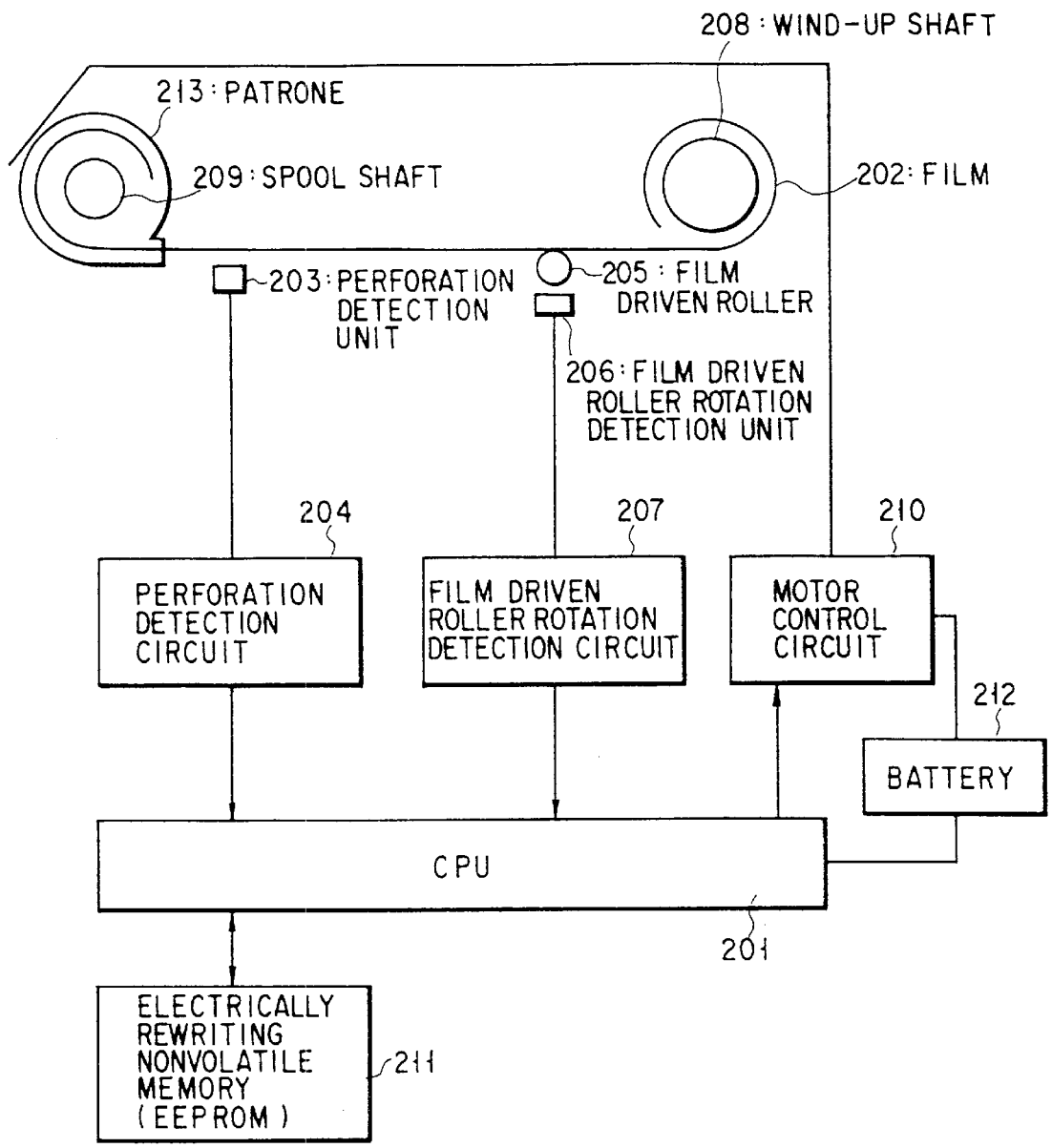
FIG. 12 is a diagram showing the arrangement of a film feeding unit as the characteristic feature of a camera according to the second embodiment of the present invention.

FIG. 12 shows the arrangement of a film feeding unit as the characteristic feature of a camera according to the second embodiment of the present invention.

As shown in FIG. 12, a CPU (Central Processing Unit) 201 is connected to a perforation detection unit 203 for detecting perforations formed on a film 202 having two perforations per frame via a perforation detection circuit 204 for processing a signal generated by the perforation detection unit 203.

The CPU 201 is also connected to a driven roller rotation detection unit 206 which comprises a film driven roller 205, which contacts the film 202 and is rotated upon movement of the film 202, and detects the rotation of the film driven roller 205 via a film driven roller rotation detection circuit 207 for processing a signal generated by the film driven roller rotation detection unit 206.

Furthermore, the CPU 201 is connected to a motor control circuit 210 for controlling a motor (not shown) for driving a wind-up shaft 208 for winding up the film 202 and a spool shaft 209 for rewinding the film 202.

Also, the CPU 201 is connected to an electrically rewritable nonvolatile memory (to be referred to as an EEPROM hereinafter) 211 for storing the state of the camera, i.e., the feeding state, and the like, and a battery 212 for driving the perforation detection circuit 204, the film driven roller rotation detection circuit 207, the motor control circuit 210, the EEPROM 211, the perforation detection unit 203, the film driven roller rotation detection unit 206, and the CPU 201.

Note that the CPU 201 controls the perforation detection circuit 204, the film driven roller rotation detection circuit 207, the motor control circuit 210, and other units (not shown) in the camera.

Figure 13:
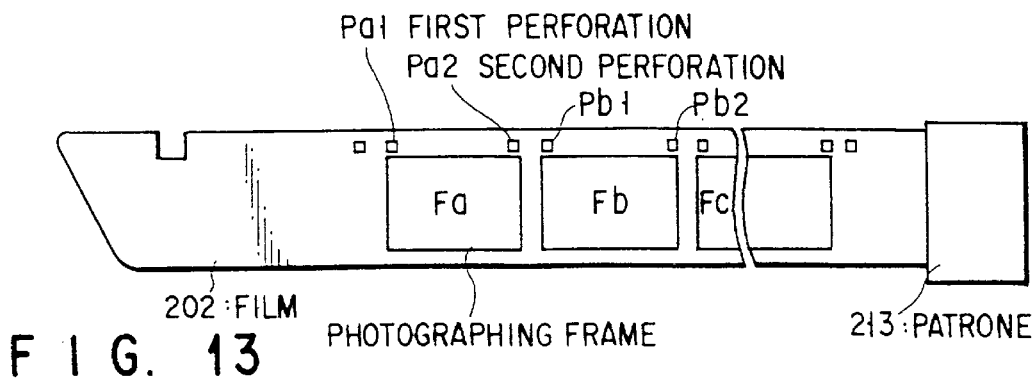
FIG. 13 is a view showing the arrangement of a film having two perforations per frame.

The film 202 is stored in a patrone 213, and has two perforations, i.e., a first perforation Pa1 and a second perforation Pa2 on a photographing frame Fa, as shown in FIG. 13. The next photographing frame Fb also has two perforations, i.e., a first perforation Pb1 and a second perforation Pb2. Thus, the film 202 has two perforations per photographing frame.

Figure 14:
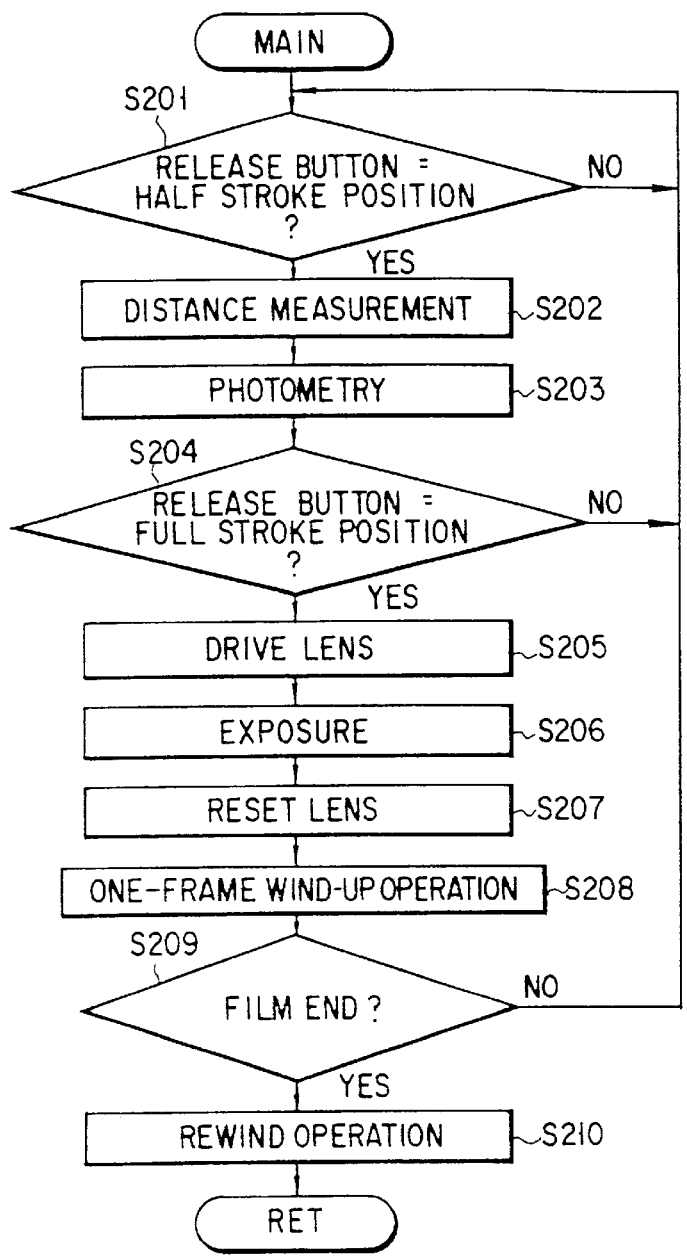
FIG. 14 is a flow chart showing the processing of a main routine of a CPU 1 as a main operation of the camera of the second embodiment.
Figure 15:
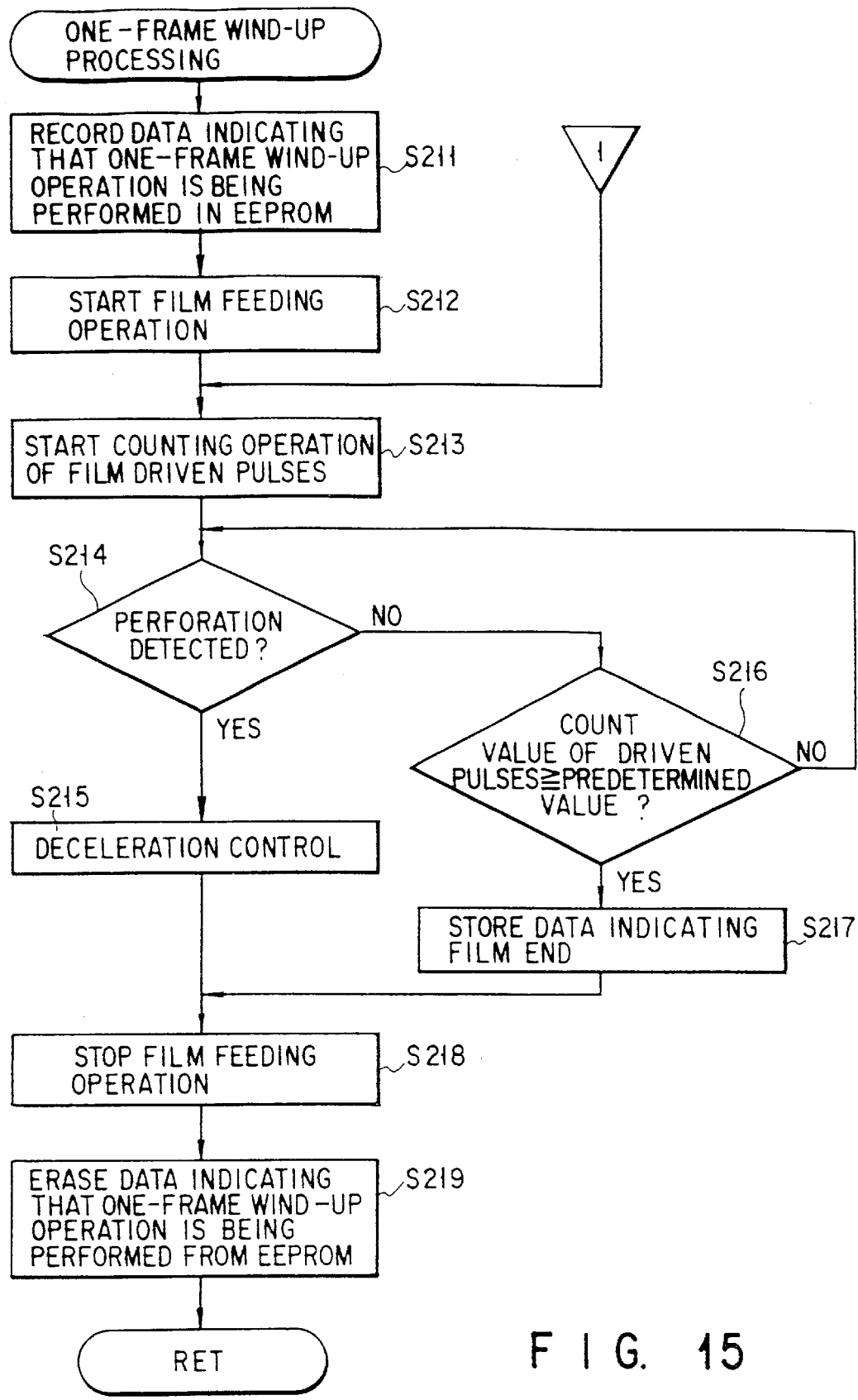
FIG. 15 is a flow chart showing an example of one-frame wind-up processing.
Figure 16:
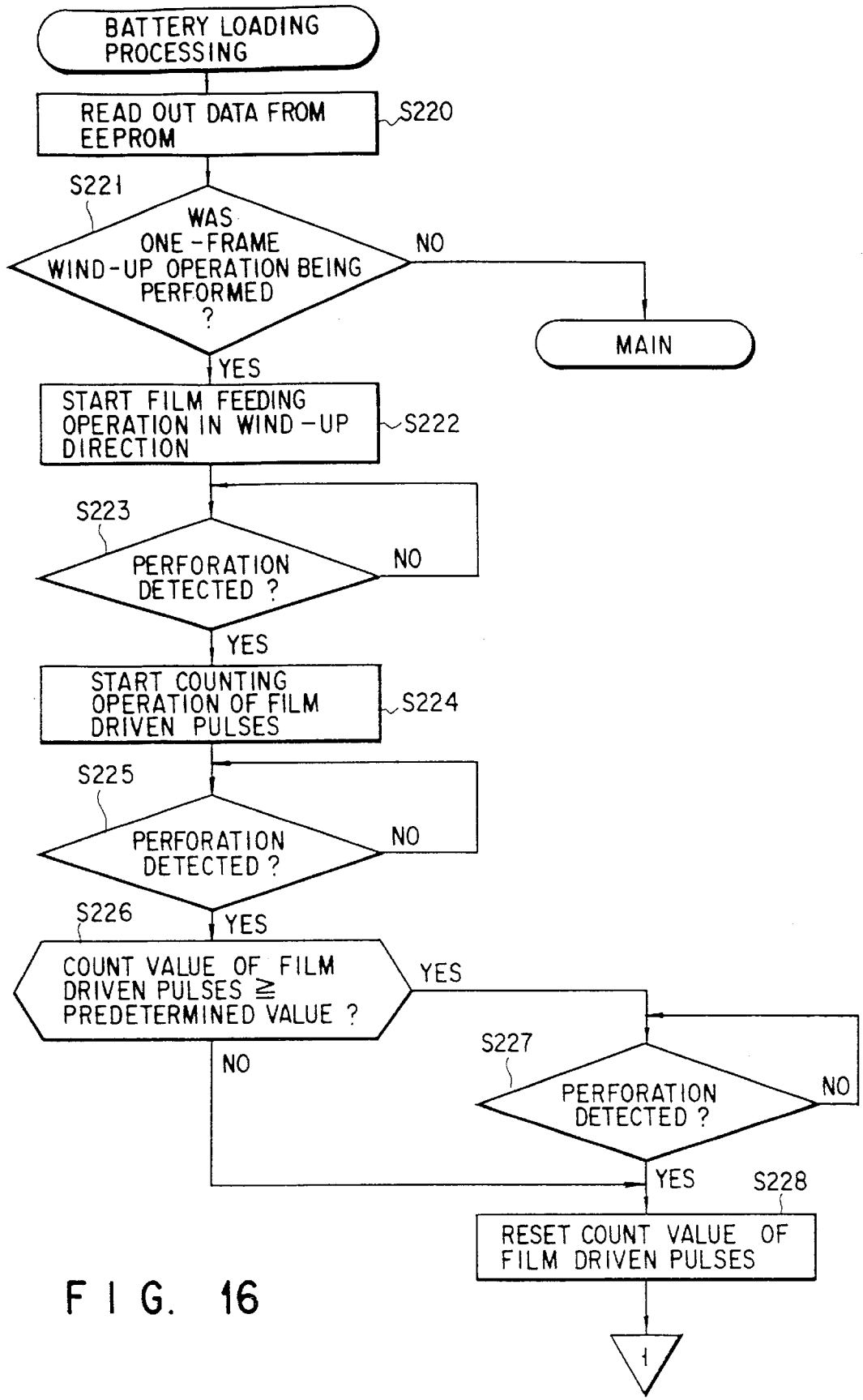
FIG. 16 is a flow chart showing an example of processing (i.e., processing upon loading of a battery) executed when a power supply is interrupted during the one-frame wind-up processing, and thereafter, the power supply is recovered.
Figure 18:
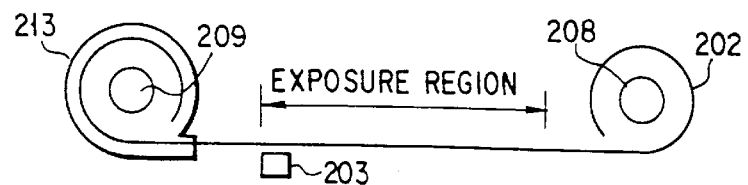
FIG. 18 is a view showing the setting position of a perforation detection unit with respect to the photographing frames on a film.
Figure 19:
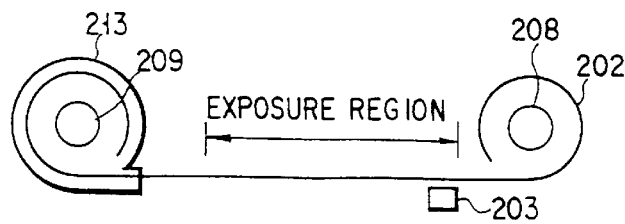
FIG. 19 is a view showing another setting position of a perforation detection unit with respect to the photographing frames on a film.

FIG. 14 is a flow chart showing the main processing of the CPU 201 as the main operation of the camera according to the second embodiment of the present invention, and FIG. 15 is a flow chart showing an example of one-frame wind-up processing in the main processing shown in FIG. 14. FIGS. 16 and 17 are flow charts showing the processing (i.e., processing upon battery loading) executed when the power supply to the camera by the battery 212 is interrupted during the one-frame wind-up processing shown in FIG. 15, and the power supply is recovered. FIGS. 18 and 19 show the setting positions of the perforation detection unit 203 corresponding to the flow charts shown in FIGS. 16 and 17.

The operation of the camera according to the second embodiment of the present invention will be described below with reference to the flow charts shown in FIGS. 14, 15, 16, and 17.

Referring to FIG. 14, if the CPU 201 determines in step S201 that a release switch (not shown) is depressed to the half stroke position, the flow advances to step S202, and the distance to an object is measured by a distance measuring unit (not shown). In step S203, the CPU 201 performs a photometry operation using a photometry unit (not shown).

In step S204, the CPU 201 checks if the release switch is depressed to the full stroke position. If NO in step S204, the flow returns to step S201; otherwise, the flow advances to step S205. In step S205, the CPU 201 performs a lens driving operation for focusing on the basis of the distance measurement result. In step S206, the CPU 201 performs an exposure operation of a photographing frame.

In step S207, the CPU 201 resets the lens to an initial position. In step S208, the CPU 201 performs a one-frame wind-up operation to prepare for the next photographing operation.

In step S209, the CPU 201 checks if the film has reached the film end. If YES in step S209, the film is rewound in step S201; otherwise, the flow returns to step S201 to prepare for the next photographing operation.

Note that various methods of discriminating the film end have been proposed, and the film end may be discriminated by any method although a description thereof will be omitted.

The one-frame wind-up processing by the CPU 201 in step S208 above will be described below with reference to FIG. 15.

When a one-frame wind-up operation is started, the CPU 201 stores data indicating that the one-frame wind-up operation is being performed in the EEPROM 211 in step S211.

In step S212, the CPU 201 controls the motor control circuit 210 to rotate the wind-up shaft 208, thus starting a feeding operation of the film 202. In step S213, the CPU 201 begins to count film driven pulses generated upon rotation of the film driven roller 205. In step S214, the CPU 201 checks if the perforation detection unit 203 detects a perforation. If NO in step S214, the flow branches to step S216; otherwise, the flow advances to step S215.

In step S216, the CPU 201 checks if the film driven roller rotation detection unit 206 detects the film driven pulses, the count value of which is equal to or larger than a predetermined value. If NO in step S216, the flow returns to step S214; otherwise, the flow advances to step S217, and the CPU 201 stores data indicating the film end in the EEPROM 211. Thereafter, the flow advances to step S218.

In step S215 after the perforation is detected in step S214, the CPU 201 performs deceleration control of the feeding operation of the film 202. Note that various methods associated with the deceleration control have been proposed, and any method may be used although a description thereof will be omitted.

In step S218, the CPU 201 stops the feeding operation of the film 202. In step S219, the CPU 201 erases the data indicating that the one-frame wind-up operation is being performed from the EEPROM 211. Thereafter, the CPU 201 ends the one-frame wind-up processing, and the flow returns to the main processing shown in FIG. 14 to prepare for the next release operation.

Assume that during the one-frame wind-up processing, after the feeding operation of the film 202 is started in step S212, the power supply from the battery 212 is interrupted at an arbitrary timing, and thereafter, the power supply is recovered. At this time, the power supply may be interrupted at one of two positions, i.e., a position between two photographing frames, as shown in (b) in FIG. 20 and a position in the middle of a photographing frame, as shown in (d) in FIG. 20. Thereafter, when the power supply is recovered, either of these positions cannot be discriminated, and an index according to which the feeding operation of the film 202 is to be stopped is lost.

In view of this problem, the processing upon loading of a battery will be described below with reference to the flow chart in FIG. 16. When the battery 212 is loaded, and the power supply is recovered, the CPU 201 reads out data stored in the EEPROM 211 in step S220, and checks based on the readout data in step S221 if a one-frame wind-up operation was being performed at the time of interruption of the power supply. If NO in step S221, the control of the CPU 201 returns to the main processing shown in FIG. 14. On the other hand, if YES in step S221, the CPU 201 starts a feeding operation of the film 202 in the wind-up direction in step S222.

In step S223, the CPU 201 checks if the perforation detection unit 203 detects the first perforation. If NO in step S223, the feeding operation of the film 202 is continued; otherwise, the count operation of film driven pulses by the film driven roller rotation detection circuit 207 is started in step S224. Then, the CPU 201 checks in step S225 if the perforation detection unit 203 detects the second perforation. The count operation of the film driven pulses is continued until the second perforation is detected. If the second perforation is detected, the flow advances to step S226.

In step S226, the CPU 201 checks if the count value of the film driven pulses is equal to or larger than a predetermined value. If NO in step S226, the CPU 201 determines that the power supply is interrupted at a position in the middle of a photographing frame, i.e., in a state shown in (d) in FIG. 20, and resets the count value of the film driven pulses of the film driven roller rotation detection circuit 207 in step S228 so as to perform deceleration control of the film 202 after the next perforation is detected. Thereafter, the flow advances to step S213 in the flow chart of the one-frame wind-up processing shown in FIG. 15. With the above-mentioned control, the next frame to be photographed can be set at the photographing region.

Figure 20:
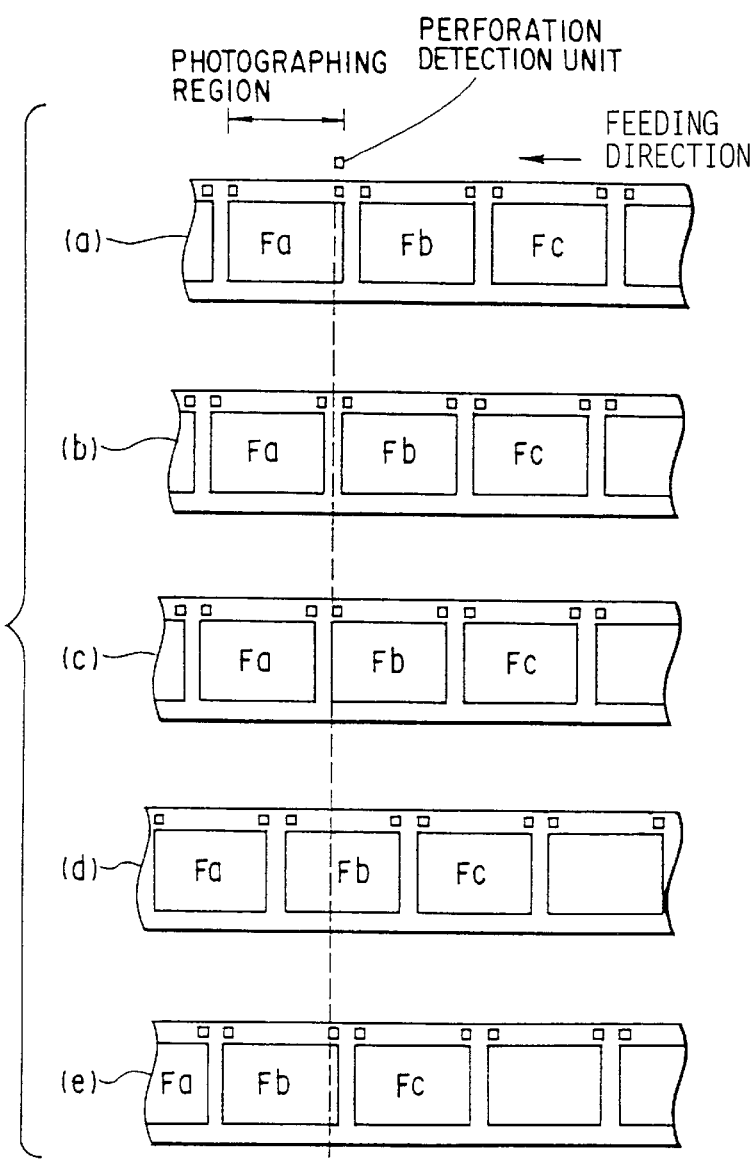
FIG. 20 is a view showing the positional relationship between the perforation detection unit and photographing frames on a film.
Figure 21:
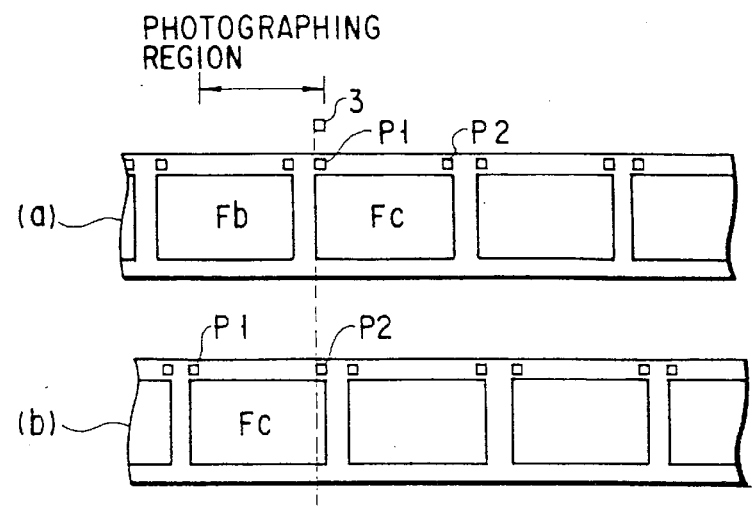
FIG. 21 is a view showing a set state of photographing frames with respect to a photographing region.

On the other hand, if it is determined in step S226 that the count value of the film driven pulses is equal to or larger than the predetermined value, the CPU 201 determines that the power supply is interrupted at a position between two photographing frames, i.e., in a state shown in (b) in FIG. 20. However, in this case, if the deceleration control is performed to stop the feeding operation of the film 202 after the next perforation P1 is detected in the same manner as in the above case wherein the power supply is interrupted in the middle of a photographing frame, the photographing frame is set at a position deviating from the photographing region, as shown in (a) in FIG. 21.

For this reason, after the next perforation P1 is detected in step S227, the CPU 201 resets the count value of the film driven pulses of the film driven roller rotation detection circuit 207 in step S228, and the flow advances to step S213 in the flow chart of the one-frame wind-up processing shown in FIG. 15. In this manner, when the deceleration control is performed to stop the feeding operation of the film 202 after the next perforation P2 is detected, the photographing frame Fc can be set at the photographing region.

As described above, according to the second embodiment of the present invention, even when the power supply is interrupted due to any cause during one-frame feeding control, the next photographing frame to be photographed can be set at the photographing region.

As causes for interrupting the power supply, a case wherein a user of the camera opens the cover of a battery chamber or removes the battery 212, chattering between the battery 212 and battery contacts due to a vibration or a shock generated when the camera is dropped, and the like are known. However, the present invention is not limited to these causes.

The film driven roller 205 is rotated upon movement of the film 202, and the film driven roller rotation detection unit 206 detects the rotation of the film driven roller 205 to generate a signal finer than that generated upon detection of a perforation.

In the second embodiment of the present invention, the perforation detection unit 203 is arranged near a patrone chamber, as shown in FIG. 18. When the perforation detection unit 203 is arranged near a spool chamber, as shown in FIG. 19, the branching destinations as a result of discrimination in step S236 in the flow chart shown in FIG. 17 are reversed with respect to those in step S226 in the flow chart shown in FIG. 16, thus obtaining the same effect as described above.

A camera according to the third embodiment of the present invention will be described below.

Since the arrangement of a film feeding unit as the characteristic feature of the camera according to the third embodiment of the present invention is the same as that of the second embodiment, a description thereof will be inserted herein and will be omitted.

Figure 22:
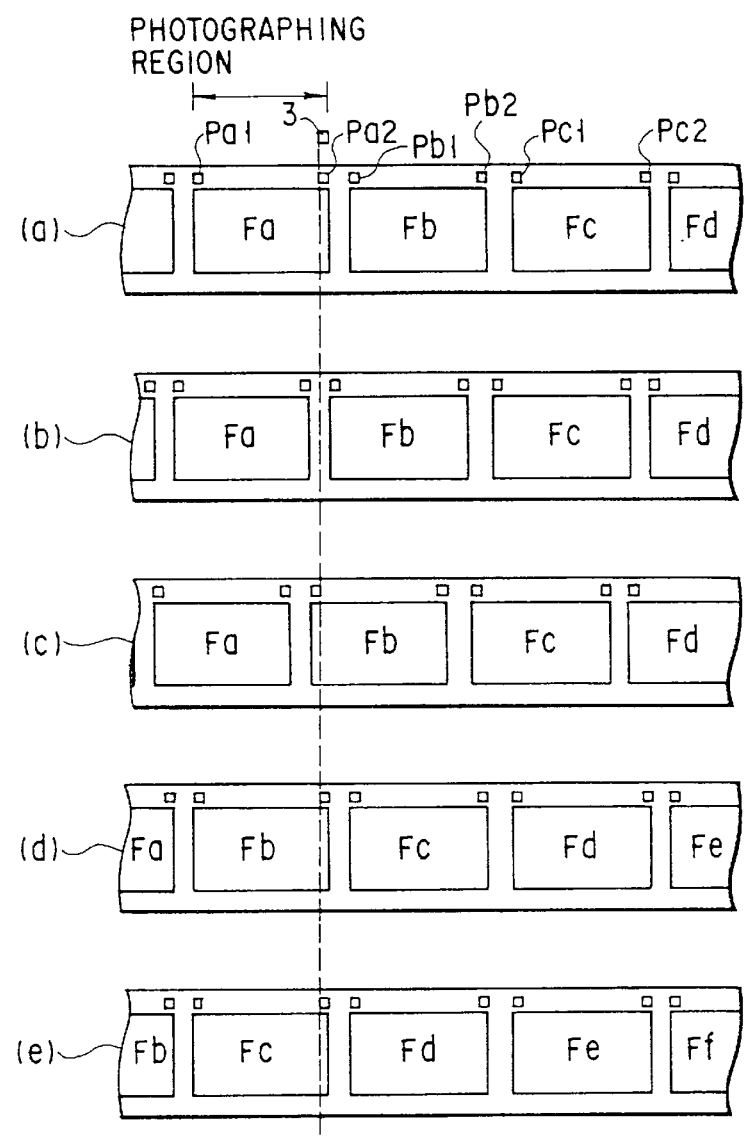
FIG. 22 is a view showing the positional relationship between the perforation detection unit and the photographing frames on a film.

The processing of the CPU 201 as the operation of the camera according to the third embodiment of the present invention will be described below with reference to the flow charts shown in FIGS. 14, 23, and 24. FIG. 22 shows the positional relationship between the perforation detection unit 203 and the photographing frames of the film 202 at that time.

Referring to FIG. 14, if the CPU 201 determines in step S201 that the release switch is depressed to the half stroke position, the flow advances to step S202, and the distance to an object is measured by a distance measuring unit (not shown). In step S203, the CPU 201 performs a photometry operation using a photometry unit (not shown).

In step S204, the CPU 201 checks if the release switch is depressed to the full stroke position. If NO in step S204, the flow returns to step S201; otherwise, the flow advances to step S205. In step S205, the CPU 201 performs a lens driving operation for focusing on the basis of the distance measurement result. In step S206, the CPU 201 performs an exposure operation of a photographing frame.

In step S207, the CPU 201 resets the lens to an initial position. In step S208, the CPU 201 performs a one-frame wind-up operation to prepare for the next photographing operation.

Figure 23:
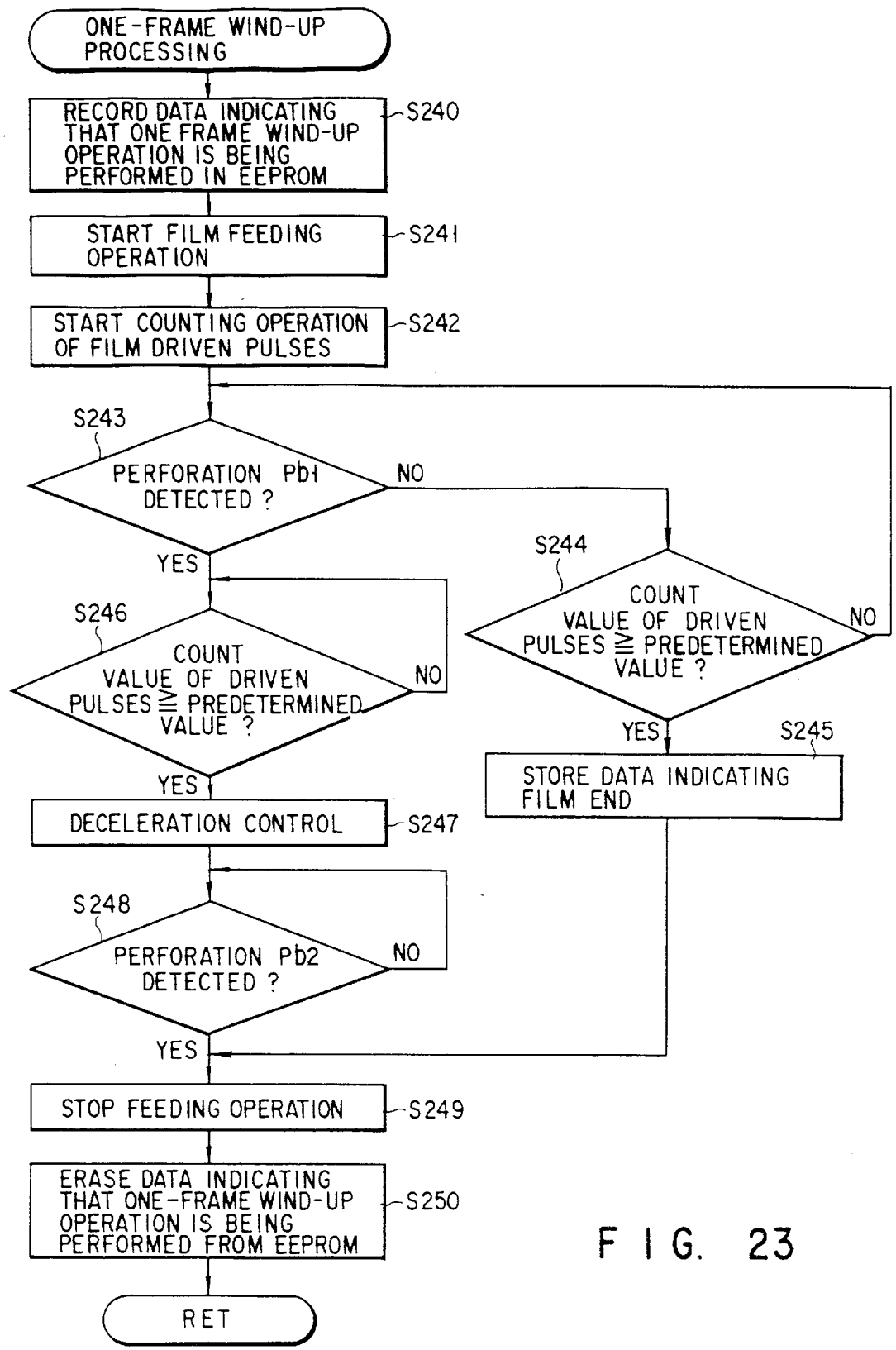
FIG. 23 is a flow chart showing an example of one-frame wind-up processing.
Figure 24:
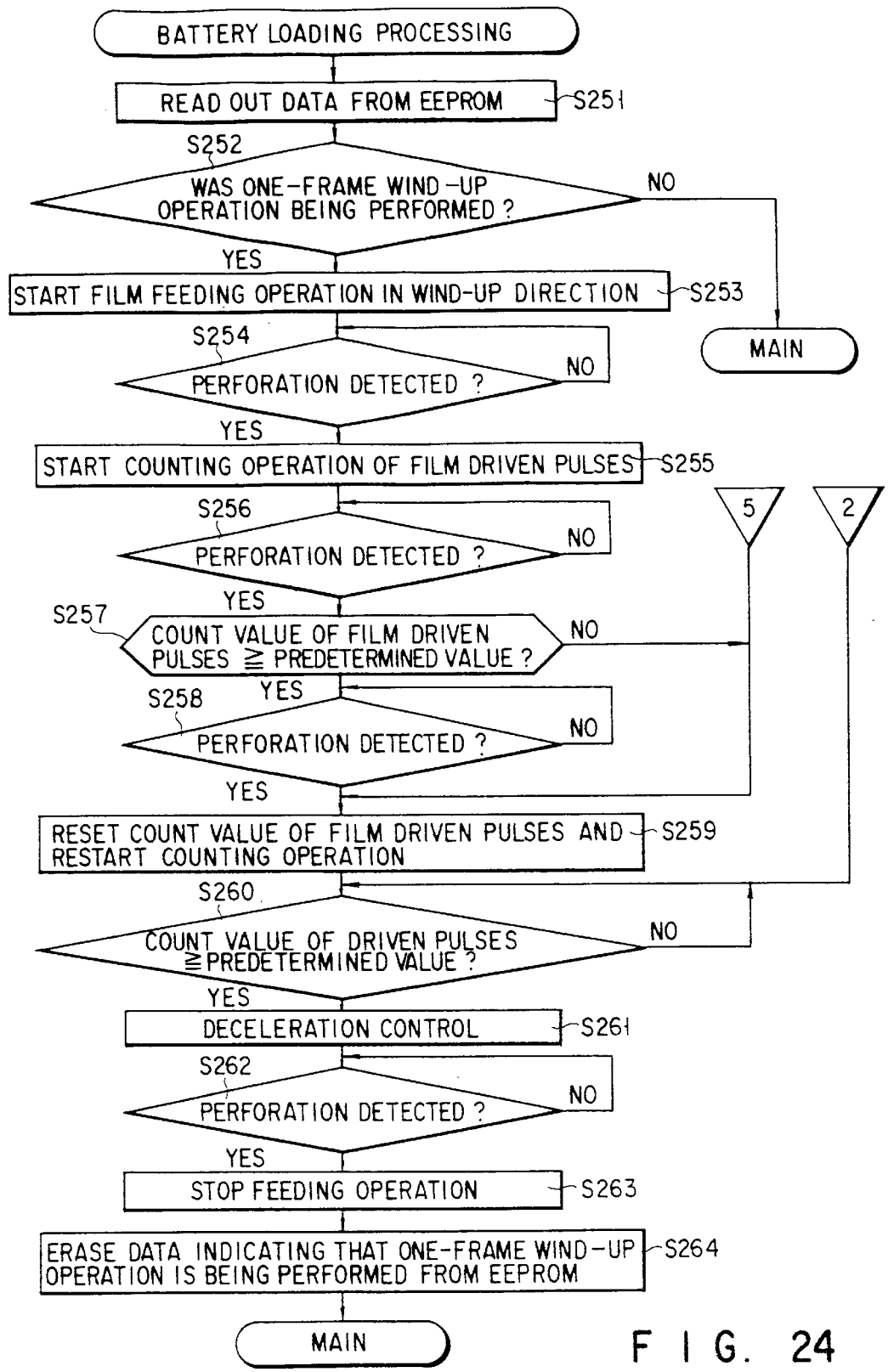
FIG. 24 is a flow chart showing an example of processing (i.e., processing upon loading of a battery) executed when a power supply is interrupted during the one-frame wind-up processing, and thereafter, the power supply is recovered.

FIG. 23 is a flow chart showing the one-frame wind-up processing in step S208. The one-frame wind-up processing will be described below with reference to this flow chart.

When the one-frame wind-up processing is started, the CPU 201 stores data indicating that the one-frame wind-up operation is being performed in the EEPROM 211 in step S240, starts feeding the film 202 in step S241, and starts the count operation of film driven pulses in step S242.

In step S243, the CPU 201 checks if the perforation Pb1 is detected. If YES in step S243, the flow advances to step S246 to check if the count value of the generated film driven pulses is equal to or larger than a predetermined value. The predetermined value is substantially equal to the number of film driven pulses generated until deceleration control is started so as to accurately stop the next photographing frame Fb at the photographing region after the perforation Pb1 is detected, and is smaller than the number of film driven pulses generated upon movement of the film 202 for one frame.

If YES in step S246, the flow advances to step S247, and the CPU 201 performs deceleration control. On the other hand, if NO in step S246, the CPU 201 repeats step S246. Note that various methods associated with the deceleration control have been proposed conventionally, but any method may be used to attain the deceleration control.

In step S248, the CPU 201 checks if the perforation Pb2 is detected. If YES in step S248, the flow advances to step S249 to stop the feeding operation of the film 202. Thereafter, the flow advances to step S250. On the other hand, if NO in step S248, the CPU 201 repeats step S248. In step S250, the CPU 201 erases the data indicating that the one-frame wind-up operation is being performed from the EEPROM 211, thus ending the one-frame wind-up processing. Then, the flow returns to the main processing shown in FIG. 14.

On the other hand, if it is determined in step S243 that the perforation Pb1 is not detected, the flow branches to step S244, and the CPU 201 checks if the count value of the detected film driven pulses is equal to or larger than a predetermined value. If NO in step S244, the flow returns to step S243; otherwise, the flow advances to step S245, and the CPU 201 stores data indicating the film end in the EEPROM 211. Thereafter, the flow advances to step S249. The subsequent processing is as described above.

In this manner, the CPU 201 executes the one-frame wind-up processing. FIG. 24 shows the processing executed when the power supply from the battery 212 is interrupted during the one-frame wind-up processing. The processing (i.e., processing upon battery loading) executed when the power supply is interrupted during the one-frame wind-up processing, and thereafter, the power supply is recovered will be described below with reference to the flow chart shown in FIG. 24.

When the battery 212 is loaded, and the power supply is recovered, the CPU 201 reads out data stored in the EEPROM 211 in step S251. In this case, the CPU 201 may read out all the data stored in the EEPROM 211 or may read out only data necessary for the subsequent processing.

In step S252, the CPU 201 checks based on the data read out from EEPROM 211 in step S251 if a one-frame wind-up operation was being performed. If NO in step S252, the flow returns to the main processing shown in FIG. 14, and the CPU 201 prepares for the next release operation.

On the other hand, if YES in step S252, a case will be exemplified below wherein the power supply is interrupted in a state shown in (b) in FIG. 22, i.e., at a position between the second perforation Pa2 of the photographed frame Fa and the first perforation Pb1 of the next photographing frame Fb.

In step S253, the CPU 201 starts the feeding operation of the film 202 in the wind-up direction. In step S254, the CPU 201 checks if the first perforation Pb1 is detected. If NO in step S254, the CPU 201 repeats step S254; otherwise, the flow advances to step S255, and the count operation of film driven pulses generated upon rotation of the film driven roller 205 is started.

In step S256, the CPU 201 checks if the second perforation Pb2 is detected. If NO in step S256, the CPU 201 repeats step S256; otherwise, the flow advances to step S257, and the CPU 201 checks if the count value of the film driven pulses generated upon rotation of the film driven roller 205 is equal to or larger than a predetermined value. Note that the predetermined value is set to be substantially equal to the number of film driven pulses generated upon rotation of the film driven roller 205 on a narrower one of the regions between adjacent perforations. For example, the predetermined value is set to be substantially equal to the number of film driven pulses corresponding to the interval between the second perforation Pa2 and the first perforation Pb1.

In this case, since the power supply was interrupted in the state shown in (b) in FIG. 22 and the number of film driven pulses generated between the first perforation Pb1 and the second perforation Pb2 is counted, YES is determined in step S257.

Furthermore, the CPU 201 checks in step S258 if the first perforation Pc1 is detected. If NO in step S258, the CPU 201 repeats step S258; otherwise, the CPU 201 resets the count value of the film driven pulses generated upon rotation of the film driven roller 205 in step S259. Thereafter, the CPU 201 restarts the count operation.

In step S260, the CPU 201 checks if the count value of the detected film driven pulses generated upon rotation of the film driven roller 205 is equal to or larger than a predetermined value. If NO in step S260, the CPU 201 repeats step S260; otherwise, the flow advances to step S261. Note that the predetermined value in this case defines the timing until the beginning of the deceleration control for precisely setting the photographing frame Fc at the photographing region after the first perforation Pc1 of the next photographing frame Fc to be set is detected, and is smaller than the number of film driven pulses generated upon movement of the film 202 for one frame.

In step S261, the CPU 201 performs the deceleration control of the film 202. As for the deceleration control, various methods have been proposed conventionally. For example, a method of decelerating a film by decreasing the driving voltage of a motor, a method of decelerating a film by reading the pulse width, and setting the driving mode of a motor in an open, short-brake, forward rotation, and reverse rotation modes in correspondence with the pulse width, a method of decelerating a film by duty-driving a motor, and the like are available. In addition to these methods, any other deceleration control methods may be used.

In step S262, the CPU 201 checks if the second perforation Pc2 is detected. If NO in step S262, the CPU 201 repeats step S262; otherwise, the CPU 201 stops the feeding operation of the film 202 in step S263 since it determines that the photographing frame Fc is set at the photographing region, as shown in (e) in FIG. 22.

In step S264, the CPU 201 erases the data indicating that a one-frame wind-up operation is being performed from the EEPROM 211. The flow then returns to the main processing shown in FIG. 14 to prepare for the next release operation.

As described above, according to the third embodiment, even when the power supply is interrupted during the one-frame wind-up operation, the next frame to be photographed can be precisely set at the photographing region. Note that the photographing frame Fb is left unexposed in the third embodiment.

As a modification of the third embodiment, a case will be described below with reference to the flow chart shown in FIG. 24 wherein the power supply from the battery 212 is interrupted in a state shown in (c) in FIG. 22.

Since the processing in steps S251 to S253 are the same as those in the third embodiment, a detailed description thereof will be omitted.

In step S254, in the third embodiment, the CPU 201 detects the first perforation Pb1. However, in this modification, the CPU 201 checks if the second perforation Pb2 is detected. If NO in step S254, the CPU 201 repeats step S254; otherwise, the flow advances to step S255 to start the count operation of the film driven pulses generated upon rotation of the film driven roller 205.

In step S256, the CPU 201 checks if the first perforation Pc1 is detected. If NO in step S256, the CPU 201 repeats step S256; otherwise, the flow advances to step S257. In this manner, the film driven pulses generated upon rotation of the film driven roller 205 are counted in correspondence with the interval between the second perforation Pb2 and the first perforation Pc1. In this case, since the count value of the film driven pulses is smaller than the predetermined value, the control of the CPU 201 advances to step S259.

Since the subsequent processing in steps S259 to S264 is the same as that in the third embodiment, a detailed description thereof will be omitted.

As described above, according to this modification, even when the power supply is interrupted during the one-frame wind-up operation, the next frame to be photographed can be precisely set at the photographing region as in the third embodiment. Note that the photographing frame Fb is also left unexposed in this modification.

A camera according to the fourth embodiment of the present invention will be described below.

Since the arrangement of the film feeding unit as the characteristic feature of the camera of the fourth embodiment is the same as that of the second embodiment, a description thereof will be inserted herein and will be omitted.

Of the processing of the CPU 201 as the operation of the camera of the fourth embodiment, since the main processing shown in FIG. 14 and the one-frame wind-up processing shown in FIG. 23 are the same as those in the third embodiment, a description thereof will be inserted herein, and will be omitted. The processing (i.e., processing upon battery loading) executed when the power supply is interrupted during the one-frame wind-up processing, which is different from that in the third embodiment, will be described below with reference to the flow chart shown in FIG. 25.

Since the processing in steps S270 to S272 is the same as that in the third embodiment, a description thereof will be omitted.

In step S273, the CPU 201 starts the count operation of film driven pulses generated upon rotation of the film driven roller 205.

In step S274, the CPU 201 checks if a perforation is detected. If NO in step S274, the flow advances to step S275 to check if the count value of film driven pulses generated upon rotation of the film driven roller 205 is equal to or larger than a predetermined value. If NO in step S275, the flow returns to step S274; otherwise, the CPU 201 determines that the power supply is interrupted at a position between the first perforation Pb1 and the second perforation Pb2, i.e., at a position in the middle of the next photographing frame, and the flow advances to step S260 shown in FIG. 24 to stop the film at the second perforation Pb2 to be detected next. Since the processing in step S260 and subsequent steps is the same as that in the third embodiment, a description thereof will be omitted. Note that the predetermined value in step S275 is substantially equal to the number of film driven pulses generated upon rotation of the film driven roller 205 between the second perforation Pa2 and the first perforation Pb1.

On the other hand, if it is determined in step S274 that the perforation is detected before the count value becomes equal to or larger than the predetermined value, the flow advances to step S276, and the CPU 201 resets the count value of the film driven pulses generated upon rotation of the film driven roller 205. In step S277, the CPU 201 restarts the count operation of film driven pulses generated upon rotation of the film driven roller 205.

In step S278, the CPU 201 checks if the count value of the film driven pulses is equal to or larger than the predetermined value. If YES in step S278, the CPU 201 determines that the power supply is interrupted in a state shown in (b) in FIG. 22, and the flow advances to step S260 shown in FIG. 24 to stop the film at the second perforation Pb2 to be detected next. Since the processing in step S260 and subsequent steps is the same as that in the third embodiment, a description thereof will be omitted.

On the other hand, if it is determined in step S278 that the count value of the film driven pulse is smaller than the predetermined value, the flow advances to step S279, and the CPU 201 checks if the next perforation is detected. If NO in step S279, the flow advances to step S278; if the next perforation is detected before the count value of the film driven pulses becomes equal to or larger than the predetermined value, the CPU 201 can determine that the power supply is interrupted at a position slightly before the second perforation Pb2 of the next photographing frame Fb. However, since the film 202 has been moved to a position where the first perforation Pc1 is detected by the perforation detection unit 203 by this time, the flow advances to step S259 shown in FIG. 24 so that the CPU 201 leaves the photographing frame Fb unexposed, and sets the next photographing frame Fc at the photographing region. Since the processing in step S259 and subsequent steps is the same as that in the third embodiment, a description thereof will be omitted.

As described above, according to the fourth embodiment, the next photographing frame to be photographed can be precisely stopped at the photographing region. In the third embodiment, the photographing frame Fc after the next photographing frame Fb is set. However, in the fourth embodiment, the photographing frame Fb can be set, and the number of photographing frames which are left unexposed can be decreased.

A camera according to the fifth embodiment of the present invention will be described below.

Since the arrangement of the film feeding unit as the characteristic feature of the camera of the fifth embodiment is the same as that of the second embodiment, a description thereof will be inserted herein, and will be omitted.

Figure 26A:
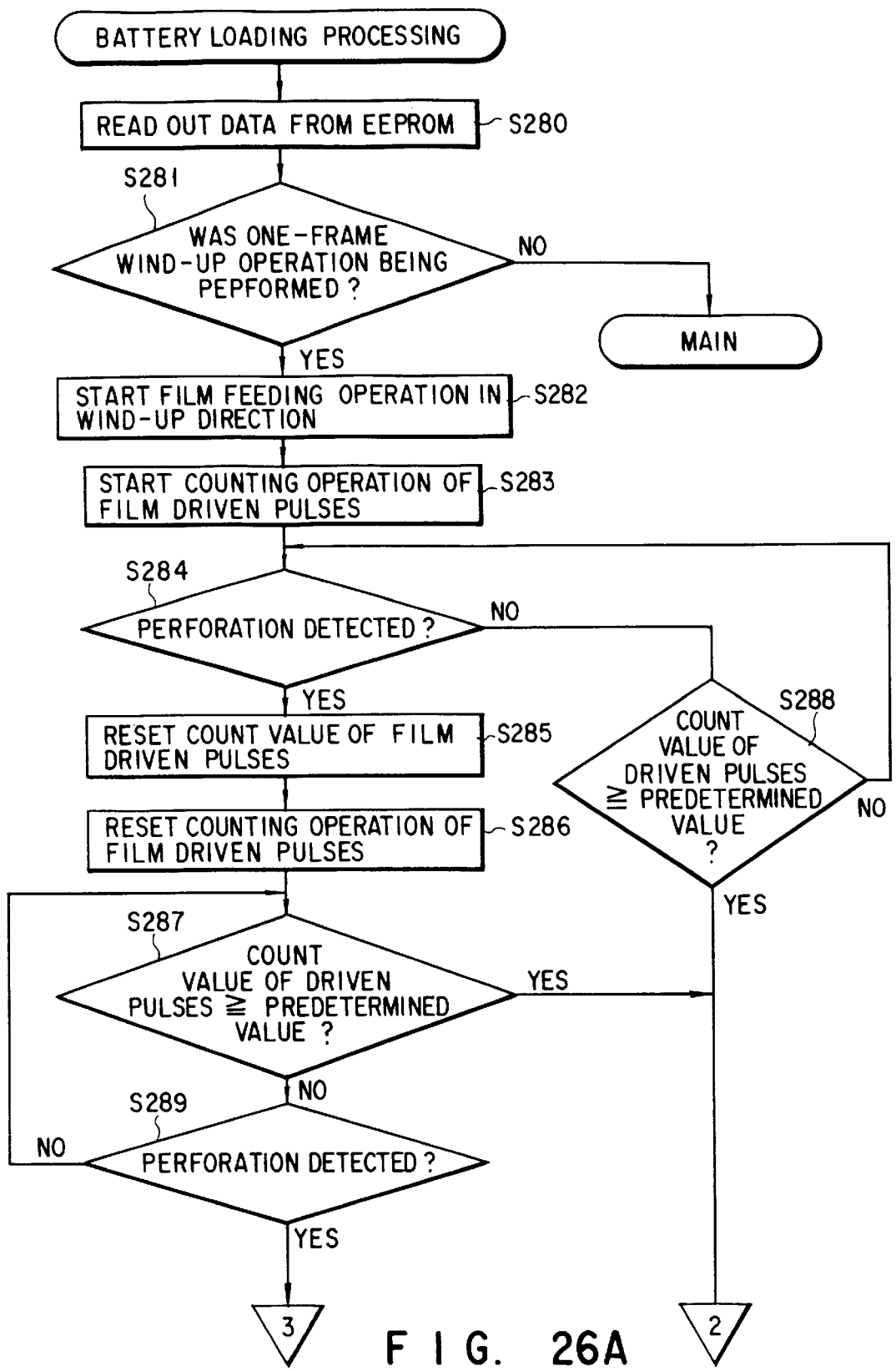
FIGS. 26A and 26B are flow charts showing an example of processing (i.e., processing upon loading of a battery) executed when a power supply is interrupted during the one-frame wind-up processing, and thereafter, the power supply is recovered.
Figure 26B:
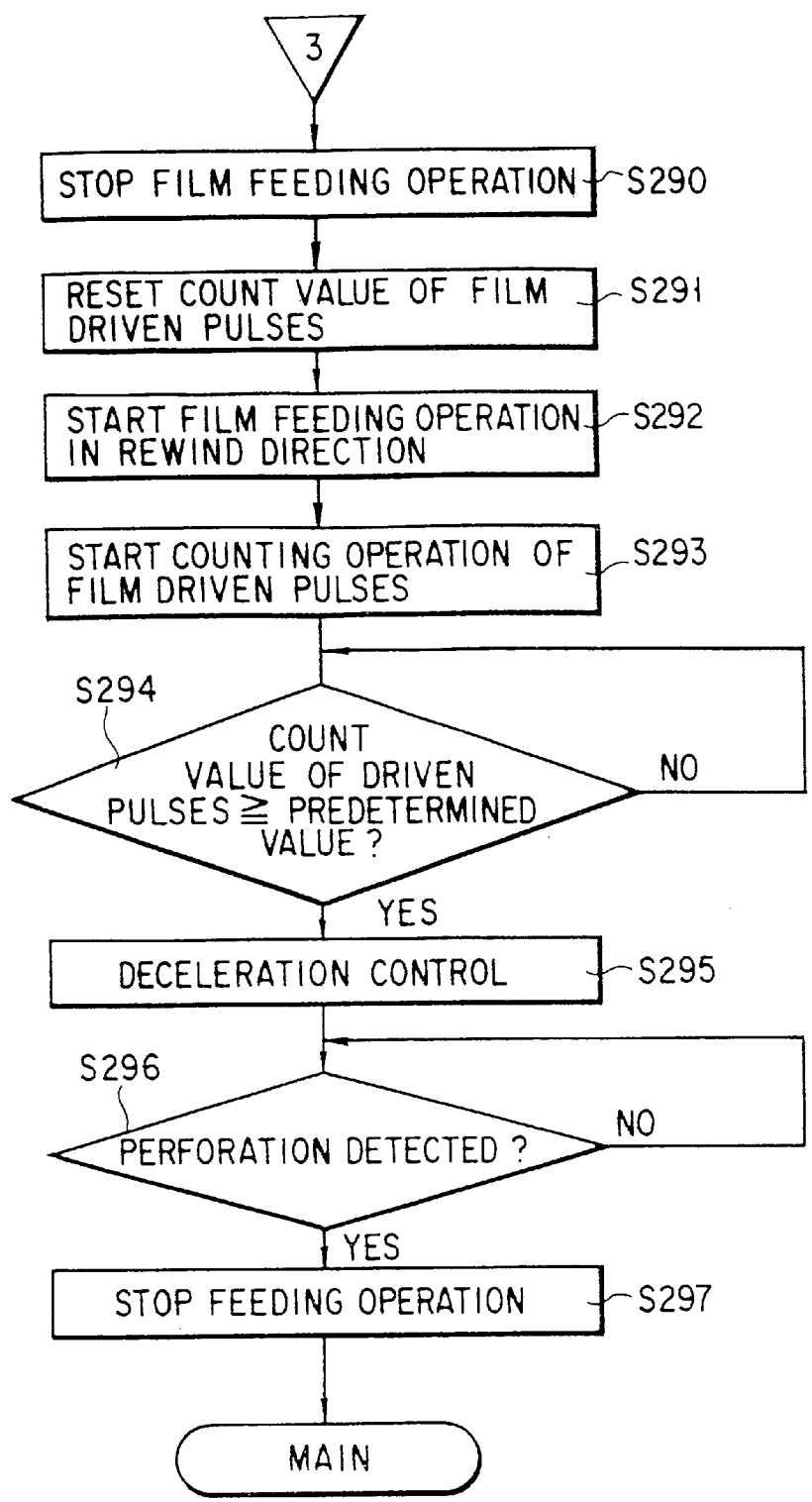

Of the processing of the CPU 201 as the operation of the camera of the fifth embodiment, since the main processing shown in FIG. 14 and the one-frame wind-up processing shown in FIG. 23 are the same as those in the third embodiment, a description thereof will be inserted herein and will be omitted. The processing (i.e., processing upon battery loading) executed when the power supply is interrupted during the one-frame wind-up processing, which is different from that in the third embodiment, will be described below with reference to the flow chart shown in FIGS. 26A and 26B.

Figure 25:
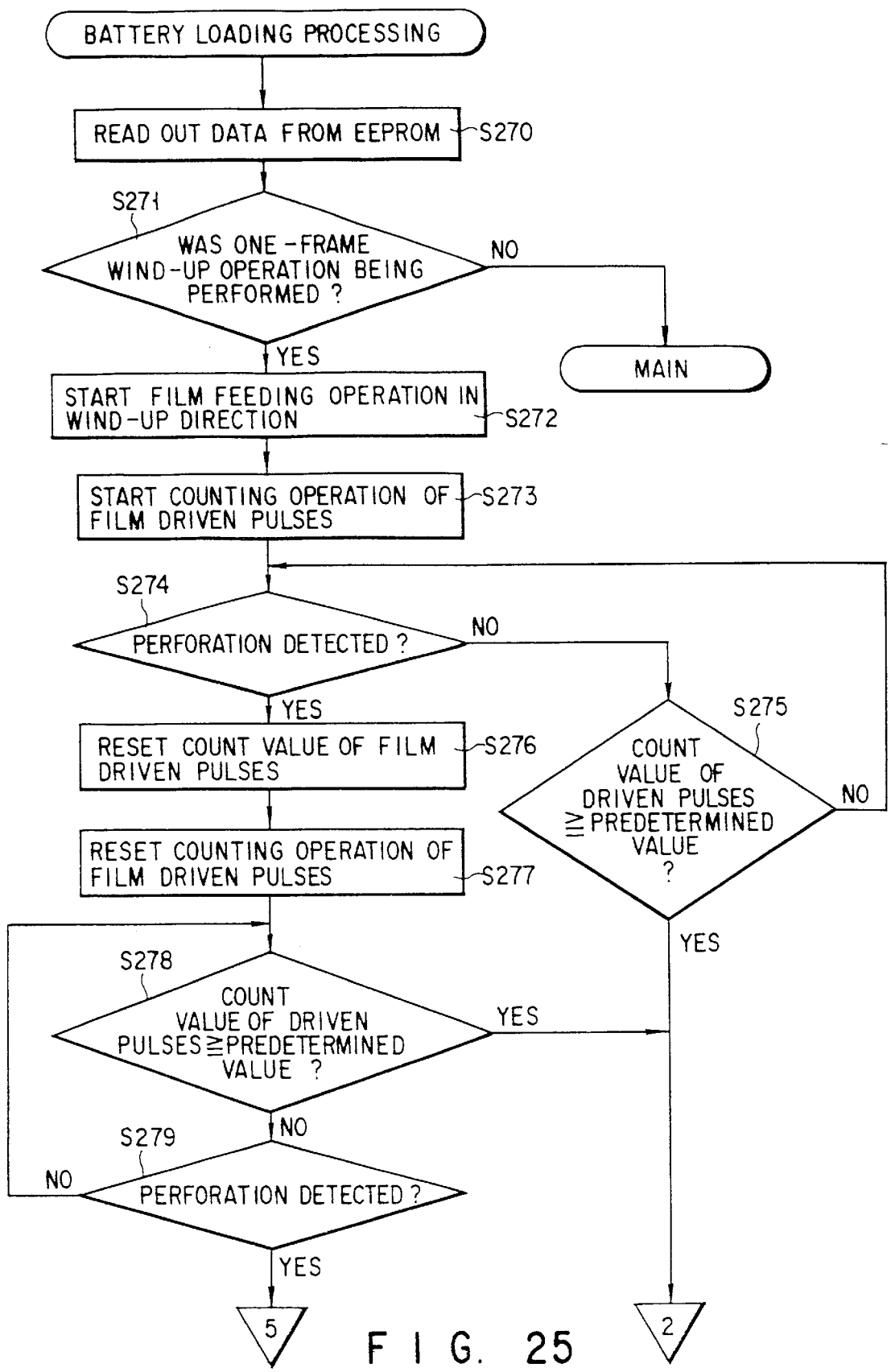
FIG. 25 is a flow chart showing an example of processing (i.e., processing upon loading of a battery) executed when a power supply is interrupted during the one-frame wind-up processing, and thereafter, the power supply is recovered.

After the power supply from the battery 212 is interrupted during a one-frame wind-up operation, when the battery 212 is loaded and the power supply is recovered, the processing in steps S280 to S289 is the same as that in steps S270 to S279 in the flow chart shown in FIG. 25 in the fourth embodiment, and a description thereof will be inserted herein and will be omitted.

The subsequent processing in steps S290 to S297 will be described below. The processing in steps S290 to S297 is applied to a case wherein the power supply from the battery 212 is interrupted in a state shown in (c) in FIG. 22, i.e., when the perforation detection unit 203 is located between the first and second perforations Pb1 and Pb2 of the photographing frame Fb, and the perforation detection unit 203 is very close to the second perforation Pb2 of the photographing frame Fb.

If the first perforation Pc1 is detected in step S289, the CPU 201 stops the feeding operation of the film 202 in step S290, and resets the count value of film driven pulses generated upon rotation of the film driven roller 205 in step S291.

The CPU 201 starts the feeding operation of the film 202 in the rewind direction in step S292, and starts the count operation of film driven pulses generated upon rotation of the film driven roller 205 in step S293.

In step S294, the CPU 201 checks if the count value of detected film driven pulses is equal to or larger than a predetermined value. If NO in step S294, the CPU 201 repeats step S294; otherwise, the flow advances to step S295 to execute deceleration control. Note that various deceleration control methods may be used as in the third embodiment.

In step S296, the CPU 201 checks if a perforation is detected. If NO in step S296, the CPU 201 repeats step S296; otherwise, the CPU 201 determines that the detected perforation is the second perforation Pb2 of the photographing frame Fb, and stops the feeding operation in step S297 since it determines that the photographing frame Fb is set at the photographing region. Thereafter, the flow returns to the main processing shown in FIG. 14 to prepare for the next release operation.

As described above, in the third embodiment, the photographing frame Fb may be left unexposed and wasted. However, according to the fifth embodiment, even when the power supply is interrupted during a one-frame wind-up operation, the photographing frame Fb can be set at the photographing region without being wasted.

A camera according to the sixth embodiment of the present invention will be described below.

Since the arrangement of the film feeding unit as the characteristic feature of the camera of the sixth embodiment is the same as that of the second embodiment, a description thereof will be inserted herein and will be omitted.

Of the processing of the CPU 201 as the operation of the camera, the sixth embodiment presents processing executed when the power supply is interrupted during rewind processing in the main processing shown in FIG. 14, and the power supply is recovered. Therefore, since other processing operations are the same as those in other embodiments except for the first embodiment, a description thereof will be inserted herein and will be omitted.

Figure 27:
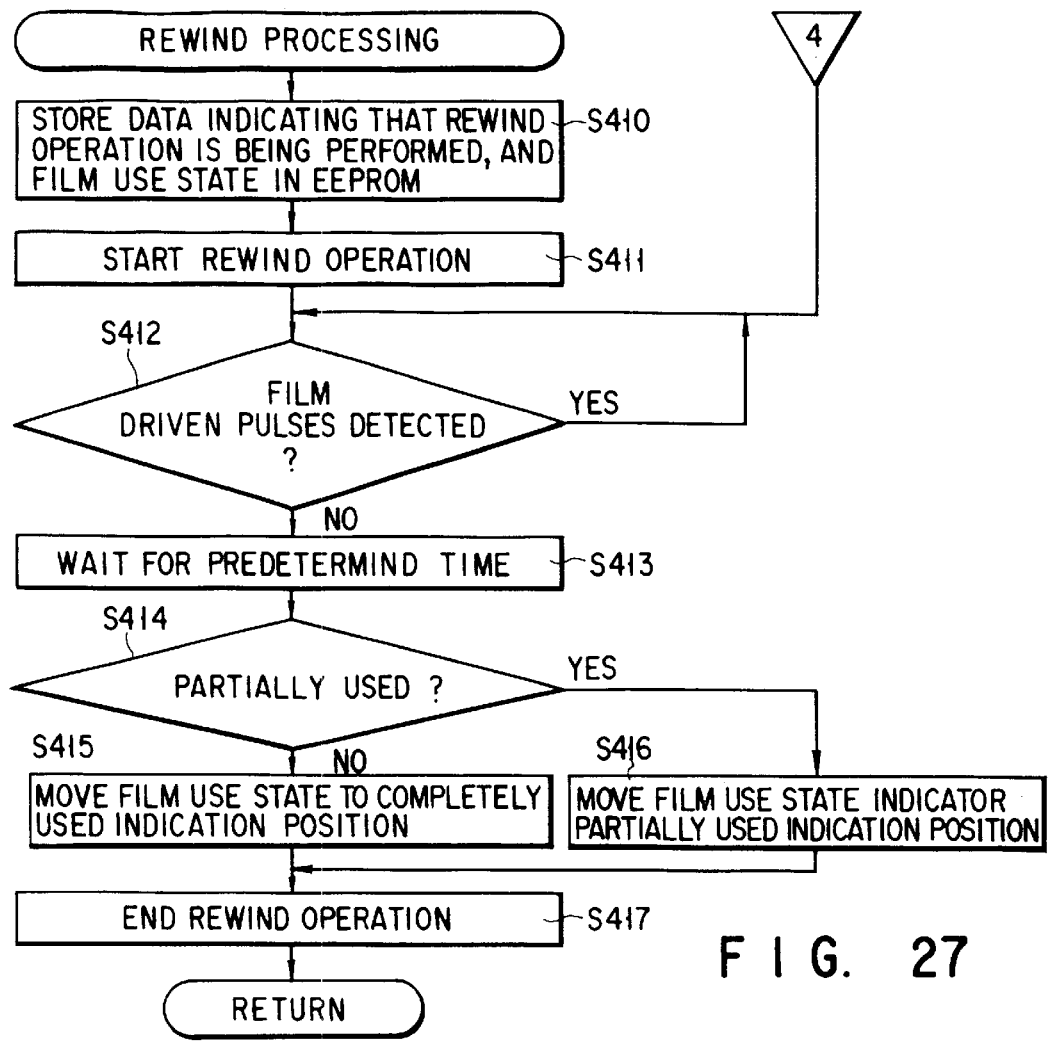
FIG. 27 is a flow chart showing rewind processing during the main processing.
Figure 28:
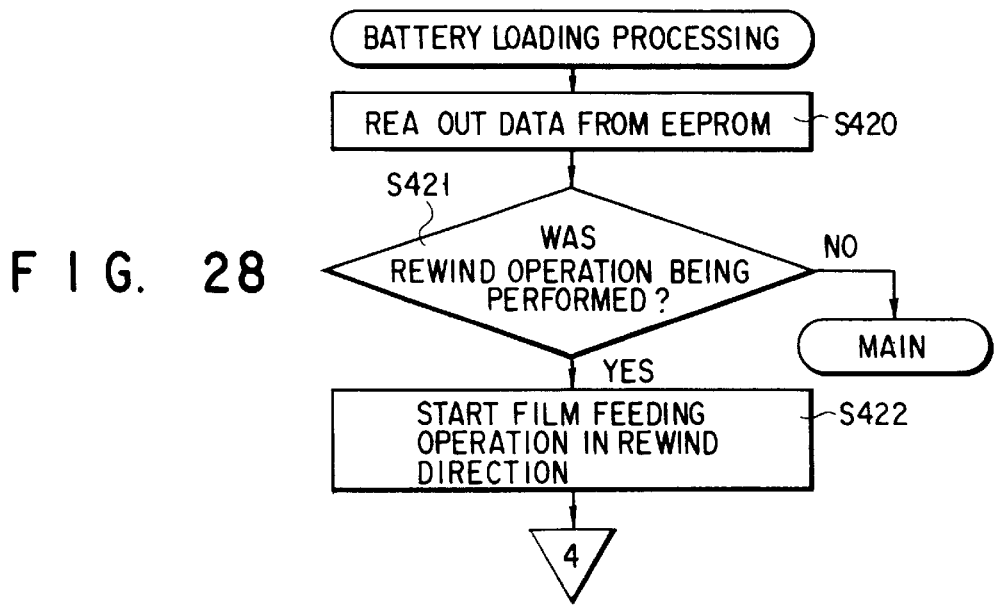
FIG. 28 is a flow chart showing an example of processing (i.e., processing upon loading of a battery) executed when a power supply is interrupted during the rewind processing, and thereafter, the power supply is recovered.

FIGS. 27 and 28 are flow charts showing the sixth embodiment. The following description will be made with reference to these flow charts.

When the CPU 201 detects the film end in step S209 in the flow chart shown in FIG. 14 or a rewind switch (not shown) is depressed, rewind processing is started. Note that various methods of detecting the film end have been proposed, and any method may be used. Thus, a detailed description of the detection method will be omitted.

In step S410, the CPU 201 stores, in the EEPROM 211, data of a film use state indicating whether the rewind processing is started in the film end state, i.e., a completely film used state, or upon depression of the rewind switch, i.e., a partially film used state.

In step S411, a rewind operation is started. In step S412, film driven pulses generated upon rotation of the film driven roller 205 are detected. In this case, the CPU 201 repeats step S412 while film driven pulses are kept generated. When no more film driven pulses are detected in step S412, the CPU 201 waits for a predetermined period of time in step S413.

In step S414, the CPU 201 checks if the state of the film 202 is the partially used state. If YES in step S414, the flow advances to step S416, and the CPU 201 controls an indication member for indicating the film use state to indicate the partially used state. On the other hand, if NO in step S414, the CPU 201 controls the indication member for indicating the film use state to indicate the completely used state in step S415.

In step S417, the CPU 201 ends the rewind processing, and the flow returns to the main processing shown in FIG. 14 to prepare for the next release operation.

FIG. 28 is a flow chart showing the processing (i.e., processing upon battery loading) executed when the power supply from the battery 212 is interrupted during the above-mentioned rewind processing, and thereafter, the power supply is recovered.

When the battery 212 is loaded, and the power supply is recovered, the CPU 201 reads out data of the film use state and data indicating whether or not the rewind processing was being performed from the EEPROM 211 in step S420.

In step S421, the CPU 201 checks based on the data read out from the EEPROM 211 if the rewind processing was being performed. If NO in step S421, the flow returns to the main processing shown in FIG. 14, and the CPU 201 prepares for the next release operation.

On the other hand, if YES in step S421, the CPU 201 starts a feeding operation of the film 202 in the rewind direction in step S422. Thereafter, the flow advances to step S412 in the flow chart shown in FIG. 27, and the processing is executed, as described above. In this case, in step S414, whether or not the film 202 is partially or completely used is checked based on the data read out from the EEPROM 211. The subsequent processing is the same as that described above.

As described above, according to the sixth embodiment, even when the power supply from the battery 212 is interrupted during the rewind processing, and thereafter, the power supply is recovered, the rewind processing can be reliably executed, and the use state of the film 202 can be reliably indicated.

A camera according to the seventh embodiment of the present invention will be described below.

Since the arrangement of the film feeding unit as the characteristic feature of the camera of the seventh embodiment is the same as that of the second embodiment, a description thereof will be inserted herein and will be omitted.

Figure 29A:
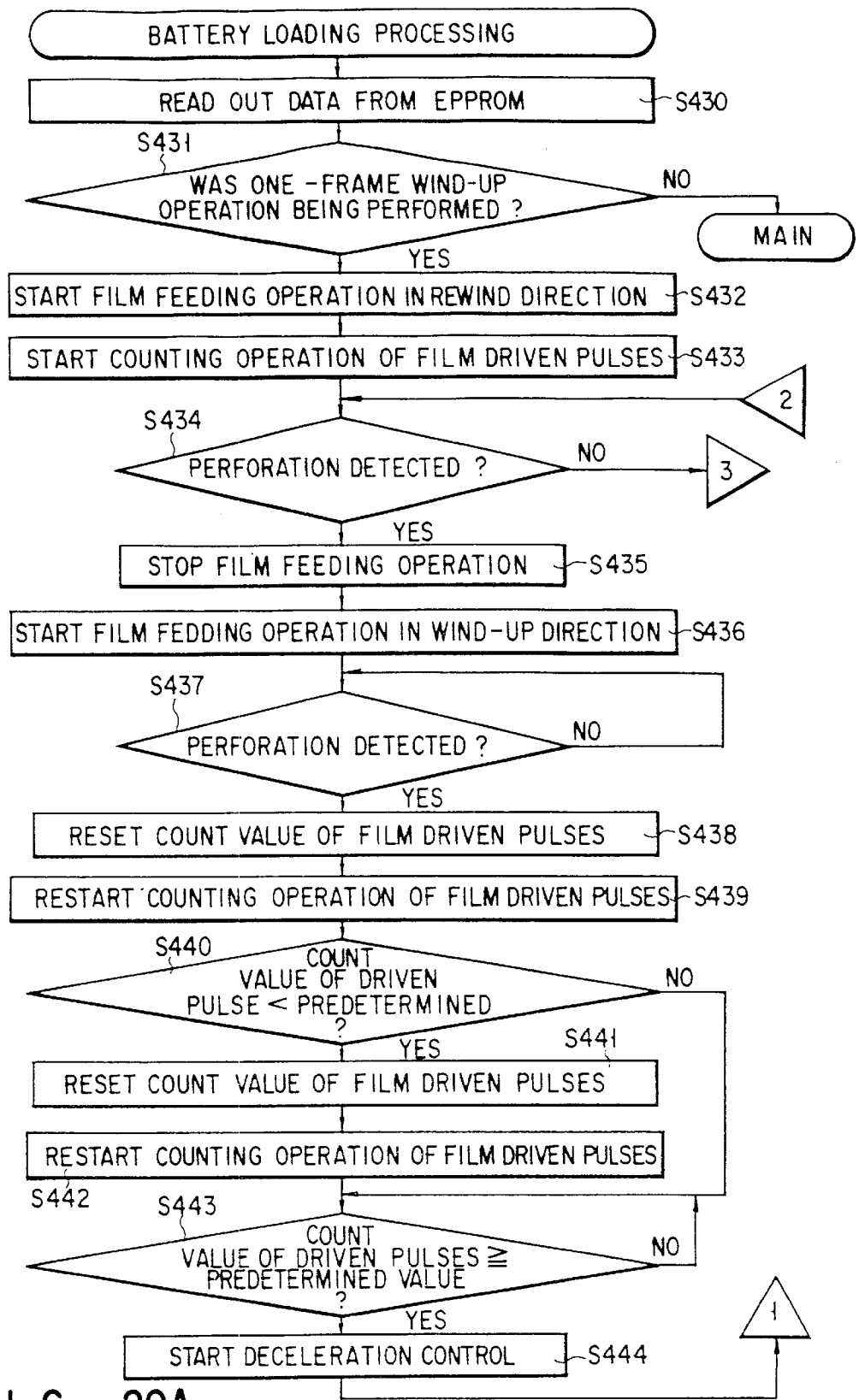
FIGS. 29A and 29B are flow charts showing an example of processing (i.e., processing upon loading of a battery) executed when a power supply is interrupted during the one-frame wind-up processing, and thereafter, the power supply is recovered.
Figure 29B:
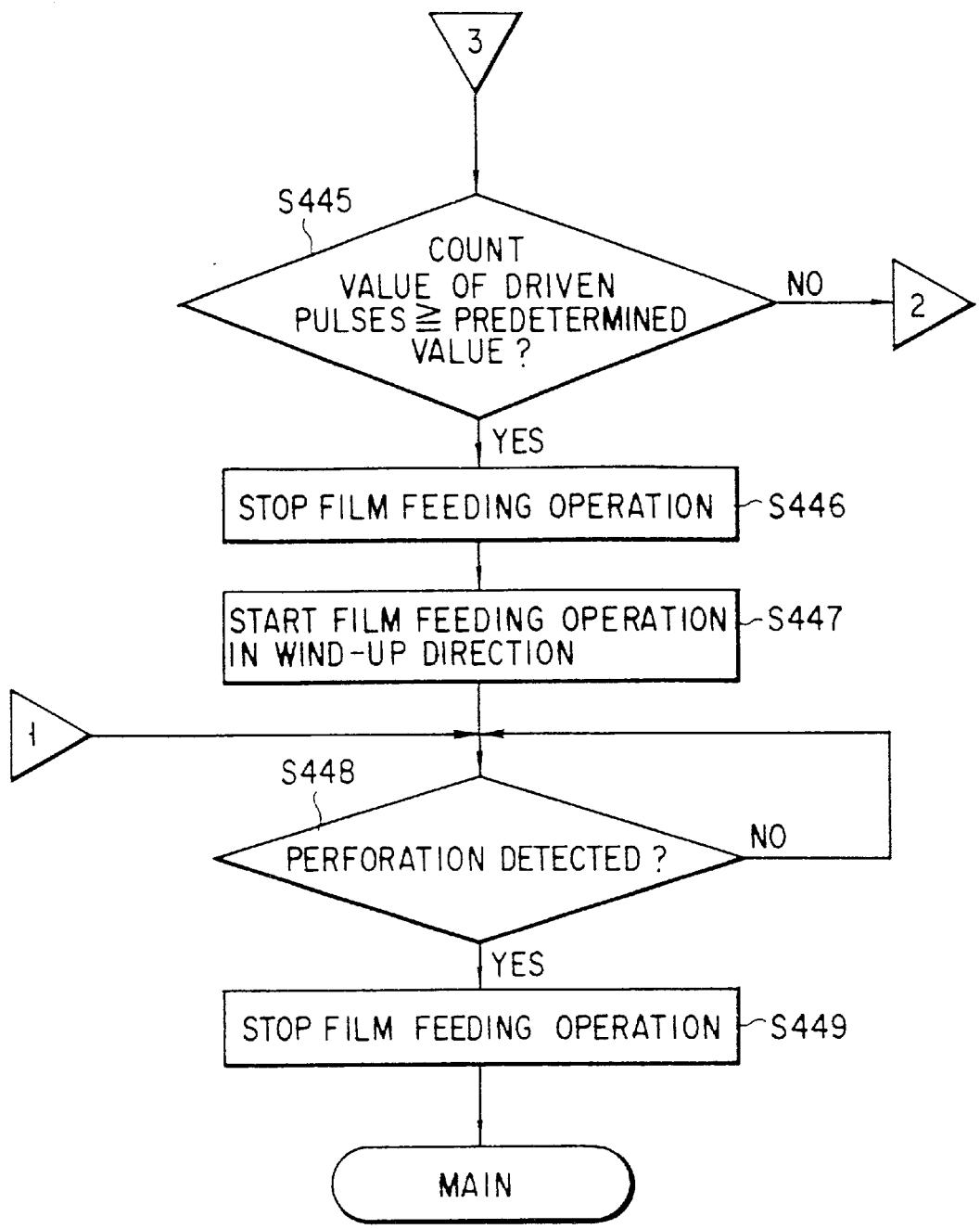

Of the processing of the CPU 201 as the operation of the camera of the seventh embodiment, since the main processing shown in FIG. 14 and the one-frame wind-up processing shown in FIG. 23 are the same as those in the third embodiment, a description thereof will be inserted herein and will be omitted. The processing (i.e., processing upon battery loading) executed when the power supply is interrupted during the one-frame wind-up processing, which is different from that in the third embodiment, will be described below with reference to the flow chart shown in FIGS. 29A and 29B.

After the power supply from the battery 212 is interrupted during the one-frame wind-up operation, when the battery 212 is loaded, and thereafter, the power supply is recovered, the CPU 201 reads out data indicating the camera state stored in the EEPROM 211 in step S430.

In step S431, the CPU 201 checks based on the data indicating the camera state read out from the EEPROM 211 if a one-frame wind-up operation was being executed. If YES in step S431, the CPU 201 starts a feeding operation of the film 202 in the rewind direction in step S432, and starts a counting operation of film driven pulses generated upon rotation of the film driven roller 205 in step S433. On the other hand, if NO in step S431, the flow returns to the main processing shown in FIG. 14, and the CPU 201 prepares for the next release operation.

In step S434, the CPU 201 checks if an immediately preceding perforation is detected. If YES in step S434, the CPU 201 stops the feeding operation of the film 202 in step S435, and starts a feeding operation of the film 202 in the wind-up direction in step S436.

In step S437, the CPU 201 checks if a perforation is detected. If NO in step S437, the CPU 201 repeats step S437; otherwise, the CPU 201 resets the count value of the film driven pulses in step S438, and restarts the counting operation of film driven pulses generated upon rotation of the film driven roller 205 in step S439.

In step S440, the CPU 201 checks if the count value of film driven pulses generated upon rotation of the film driven roller 205 is smaller than a predetermined value. If YES in step S440, the CPU 201 determines that the current position corresponds to a smaller one of the perforation intervals. Then, the CPU 201 resets the count value of film driven pulses in step S441 to obtain the start timing of deceleration control, and restarts the counting operation of film driven pulses in step S442. Note that the predetermined value in step S440 is a sum of a and the number of film driven pulses generated during the interval between the second and first perforations, i.e., a smaller perforation interval.

In step S443, the CPU 201 checks if the count value of the detected film driven pulses is equal to or larger than a predetermined value. If NO in step S443, the CPU 201 repeats step S443; otherwise, the flow advances to step S444 to start deceleration control. Thereafter, the flow advances to step S448. Note that the predetermined value corresponds to the number of film driven pulses generated during the interval from the detection of the first perforation of each photographing frame to the beginning of deceleration control, and is equal to or larger than 0 and smaller than the number of film driven pulses corresponding to a larger one of the perforation intervals. As for the deceleration control, various deceleration control methods may be used as in the third embodiment.

In step S448, the CPU 201 checks if a perforation is detected. If NO in step S448, the CPU 201 repeats step S448; otherwise, the CPU 201 stops the feeding operation of the film 202 in step S449. Then, the flow returns to the main processing shown in FIG. 14 to prepare for the next release operation.

On the other hand, if it is determined in step S440 above that the count value of film driven pulses is not smaller than the predetermined value, the CPU 201 determines that the current position corresponds to a larger one of the perforation intervals, and the flow advances to step S443. Since the subsequent processing is as described above, a description thereof will be omitted.

On the other hand, if it is determined in step S434 that a perforation is not detected, the flow branches to step S445, and the CPU 201 checks if the count value of film driven pulses generated upon rotation of the film driven roller 205 is equal to or larger than a predetermined value. Note that the predetermined value in this case corresponds to the sum of ~ and the number of film driven pulses which is larger than the predetermined value in step S440, i.e., the sum of ' and the number of film driven pulses generated during the smaller perforation interval, and is smaller than the film driven pulses corresponding to the larger perforation interval. If it is determined in step S445 that the count value of film driven pulses is equal to or larger than the predetermined value, the CPU 201 stops the feeding operation of the film 202 in step S446, and starts a feeding operation of the film 202 in the wind-up direction in step S447. On the other hand, if it is determined in step S445 that the count value is smaller than the predetermined value, the flow returns to step S434. Since the subsequent processing is as described above, a description thereof will be omitted.

As described above, according to the seventh embodiment, even when the power supply from the battery 212 is interrupted during the one-frame wind-up operation, and thereafter, the power supply is recovered, the next photographing frame to be photographed can be set at the photographing region.

A camera according to the eighth embodiment of the present invention will be described below.

The arrangement of the film feeding unit as the characteristic feature of the camera of the eighth embodiment does not comprise the EEPROM 211 in the arrangement of the second embodiment. However, since other arrangements are the same as those in the second embodiment, a description thereof is cited herein and will be omitted.

Of the processing of the CPU 201 as the operation of the camera of the eighth embodiment, since the main processing shown in FIG. 14 is the same as that in the third embodiment, a description thereof will be inserted herein and will be omitted. The one-frame wind-up processing in a camera which does not comprise the EEPROM 211 in the arrangement of the second embodiment, and processing (i.e., processing upon battery loading) executed when the power supply is interrupted during the one-frame wind-up processing will be explained below.

Figure 30:
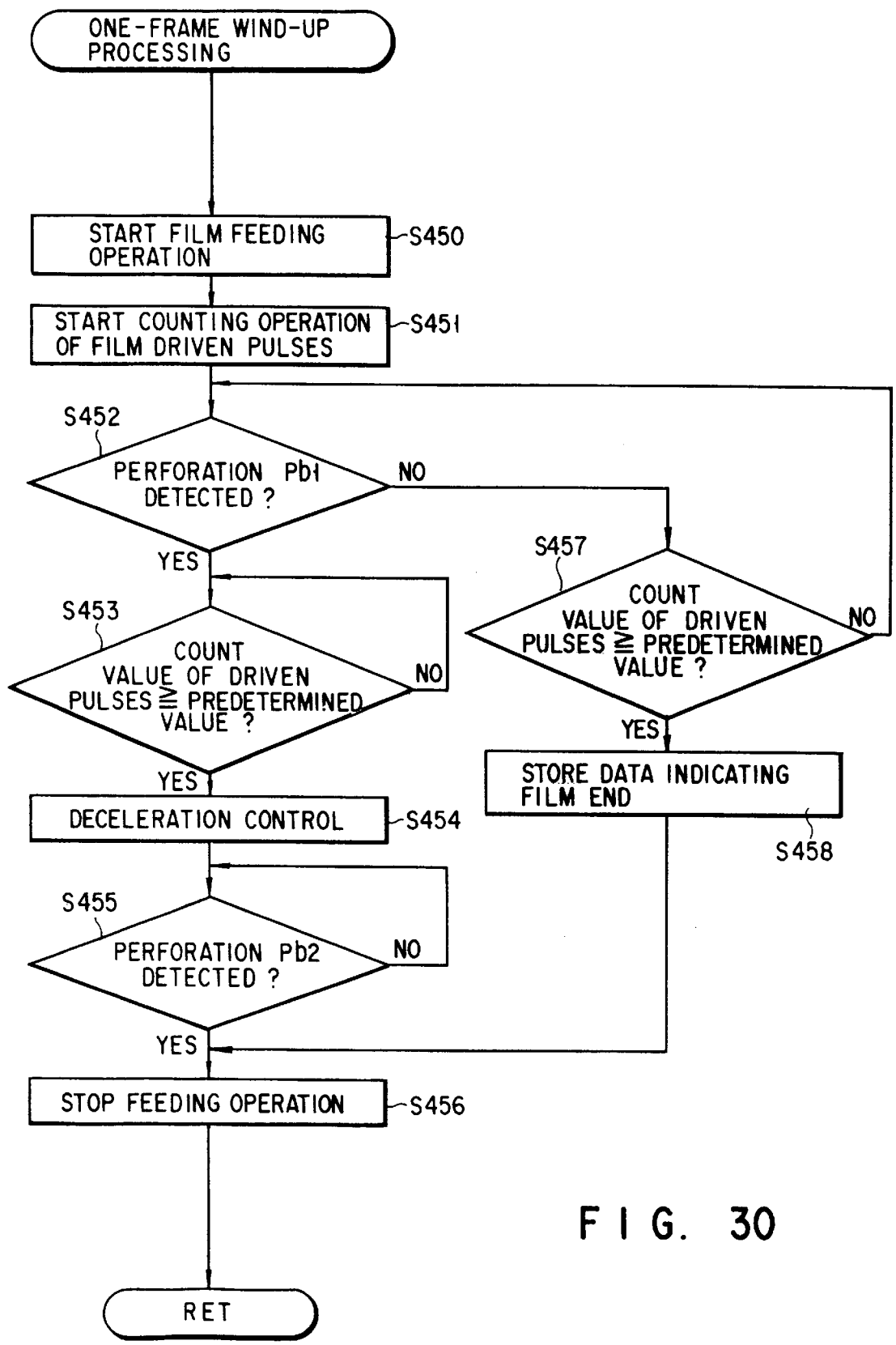
FIG. 30 is a flow chart showing an example of one-frame wind-up processing.
Figure 31:
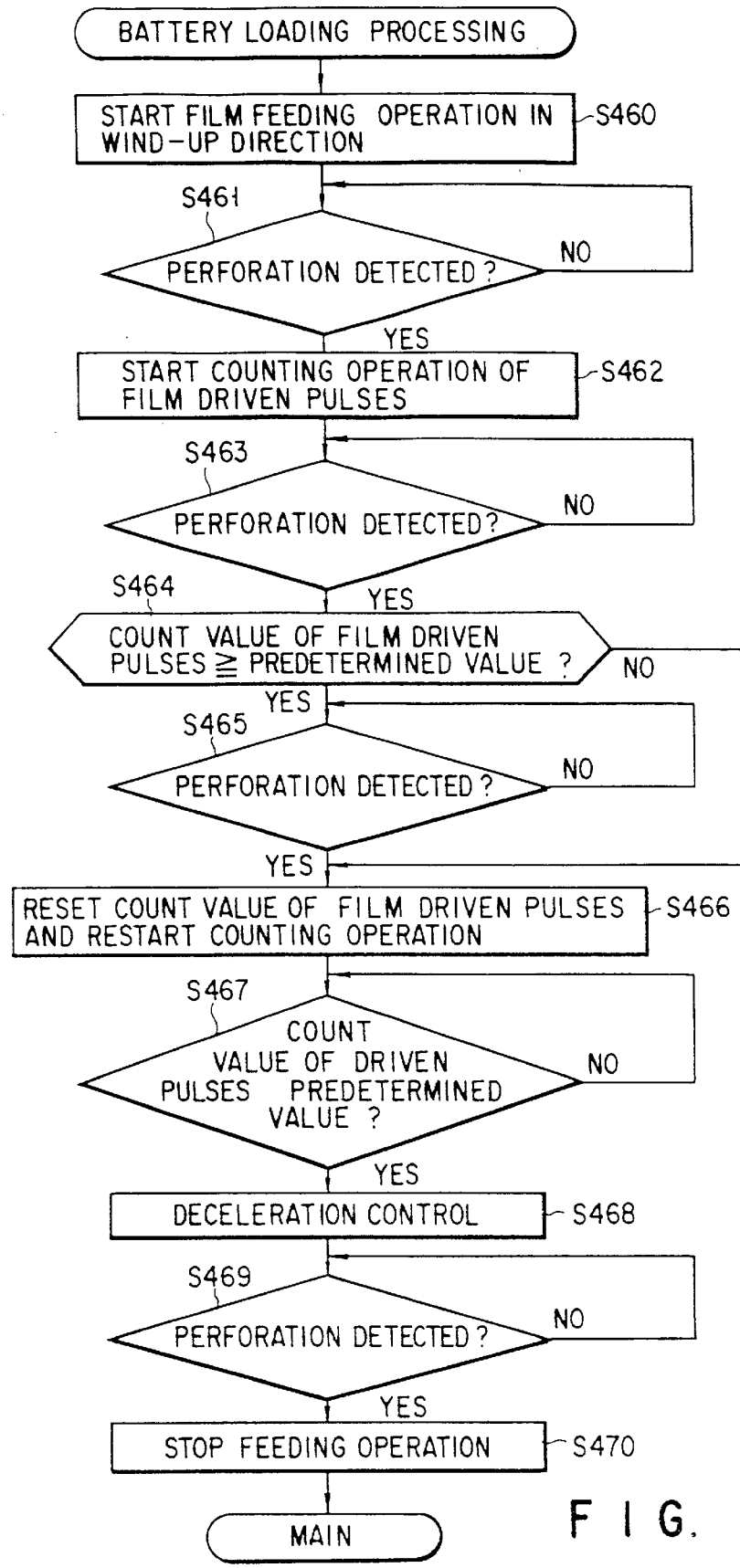
FIG. 31 is a flow chart showing an example of processing (i.e., processing upon loading of a battery) executed when a power supply is interrupted during the one-frame wind-up processing and thereafter, the power supply is recovered.

FIG. 30 is a flow chart showing the above-mentioned one-frame wind-up processing, and FIG. 31 shows the processing executed when the power supply from the battery 212 is interrupted during the one-frame wind-up processing shown in FIG. 30, and thereafter, the power supply is recovered.

The one-frame wind-up processing shown in FIG. 30 is substantially the same as that of the third embodiment shown in FIG. 23, except that steps S240 and S250 are omitted from FIG. 23. Therefore, since steps S450 to S458 shown in FIG. 30 are the same as steps S241 to S249 shown in FIG. 23, a description thereof will be omitted.

The processing executed when the power supply from the battery 212 is interrupted during the one-frame wind-up processing, and thereafter, the power supply is recovered in a camera having no EEPROM 211 will be explained below with reference to the flow chart shown in FIG. 31.

When the battery 212 is loaded and the power supply voltage is supplied, the CPU 201 starts a feeding operation of the film 202 in the wind-up direction in step S460. In step S461, the CPU 201 checks if a perforation is detected. If NO in step S461, the CPU 201 repeats step S461; otherwise, the CPU 201 starts a counting operation of film driven pulses generated upon rotation of the film driven roller 205 in step S462.

In step S463, the CPU 201 checks if a perforation is detected. If NO in step 463, the CPU 201 repeats step S463; otherwise, the CPU 201 checks in step S464 if the count value of film driven pulses generated upon rotation of the film driven roller 205 is equal to or larger than a predetermined value. In this manner, the CPU 201 discriminates a smaller or larger one of the perforation intervals on the basis of the film driven pulses generated between the two perforations. Note that the predetermined value is substantially equal to the number of driven pulses corresponding to the smaller one of the perforation intervals.

If it is determined in step S464 that the count value is equal to or larger than the predetermined value, the CPU 201 checks in step S465 if a perforation is detected. If NO in step S465, the CPU 201 repeats step S465; otherwise, the flow advances to step S466. On the other hand, if it is determined in step S464 that the count value is smaller than the predetermined value, the control of the CPU 201 similarly advances to step S466.

In step S466, the CPU 201 resets the count value of film driven pulses and restarts the counting operation. In step S467, the CPU 201 checks if the count value of film driven pulses is equal to or larger than the predetermined value. If NO in step S467, the CPU 201 repeats step S467; otherwise, the flow advances to step S468 to perform deceleration control of the film 202.

In step S469, the CPU 201 checks if a perforation is detected. If NO in step S469, the CPU 201 repeats step S469; otherwise, the flow advances to step S470 to stop the feeding operation of the film 202. Thereafter, the flow returns to the main processing shown in FIG. 14 to prepare for the next release operation.

As described above, according to the eighth embodiment, even in a camera which does not have the EEPROM 211 in the camera described in the second embodiment, when the power supply from the battery 212 is interrupted during a one-frame wind-up operation, and thereafter, the power supply is recovered, the photographing frame can be precisely set at the photographing region.

As for the deceleration control, any deceleration control method may be used as in the second to seventh embodiments.

In the description of the third to eighth embodiments, the perforation detection unit 203 is arranged at the end portion, on the patrone side, of the exposure region, as shown in FIG. 18. However, even when the perforation detection unit 203 is arranged at the end portion, on the spool chamber side, of the exposure region, as shown in FIG. 19, a photographing frame can be precisely set at the photographing region by applying the same modification as described in the second embodiment to the third to eighth embodiments.

As described above, according to the second to eighth embodiments, even when the power supply from the battery is interrupted during a film feeding operation, and thereafter, the power supply is recovered, a photographing frame can be precisely set at the photographing region, and double exposure and any displacement between the photographing frames and perforations can be prevented.

According to the second to eighth embodiments of the present invention, the following arrangements are obtained:

(1) A camera which can use a film having two perforations per photographing region of one frame, and uses a battery as a power supply, comprising:

film feeding means for feeding a film by means of a motor;

perforation detection means for detecting a perforation on the film;

film movement detection means, having a film driven roller which contacts the film and is rotated upon movement of the film, for detecting the movement of the film by detecting the number of rotations of the film driven roller; and electrically rewritable nonvolatile memory means for storing predetermined data, wherein information indicating that a film feeding operation is being performed is written in the nonvolatile memory means at the beginning of the film feeding operation, so that even when an inadvertent power failure occurs during the film feeding operation, the film feeding operation is restarted to set the film at a predetermined position on the basis of the information stored in the nonvolatile memory means when the power supply is recovered.

(2) A camera which can use a film having two perforations per photographing region of one frame, and uses a battery as a power supply, comprising:

film feeding means for feeding a film by means of a motor;

perforation detection means for detecting a perforation on the film;

film movement detection means, having a film driven roller which contacts the film and is rotated upon movement of the film, for detecting the movement of the film by detecting the number of rotations of the film driven roller; and electrically rewritable nonvolatile memory means for storing predetermined data, wherein information indicating that a film feeding operation is being performed is written in the nonvolatile memory means at the beginning of the film feeding operation, so that even when an inadvertent power failure occurs during the film feeding operation, upon restart of the film feeding operation on the basis of the information stored in the nonvolatile memory means when the power supply is recovered, the film is rewound, the rewind operation is stopped when a perforation is detected, the film is wound up, and a film moving amount between detections of first and second perforations is detected to set the film at a predetermined position.

(3) A camera which can use a film having two perforations per photographing region of one frame, and uses a battery as a power supply, comprising:

film feeding means for feeding a film by means of a motor;

perforation detection means for detecting a perforation on the film; and film movement detection means, having a film driven roller which contacts the film and is rotated upon movement of the film, for detecting the movement of the film by detecting the number of rotations of the film driven roller, wherein even when an inadvertent power failure occurs during a film feeding operation, when the power supply is recovered, the film is wound up, a film moving amount between detections of first and second perforations is detected, a perforation of a predetermined value corresponding to the detected moving amount is detected, and thereafter, the wind-up operation is stopped.

(4) A camera described in the arrangements (1) to (3), wherein when the detected number of rotations of the film driven roller is equal to or larger than a predetermined value, the film feeding operation is stopped in response to detection of a fourth perforation, and when the detected number of rotations of the film driven roller is smaller than the predetermined value, the film feeding operation is stopped in response to detection of a third perforation.

(5) A camera described in the arrangements (1) to (3), wherein when the detected number of rotations of the film driven roller is equal to or larger than a predetermined value, the film feeding operation is stopped in response to detection of a third perforation, and when the detected number of rotations of the film driven roller is smaller than the predetermined value, the film feeding operation is stopped in response to detection of a fourth perforation.

(6) A camera described in the arrangements (1) to (3), wherein when the detected number of rotations of the film driven roller is smaller than a predetermined value, the wind-up operation is stopped immediately after detection of a second perforation, the rewind operation is started, and the rewind operation is stopped in response to detection of a next perforation.

(7) A camera described in the arrangements (1) to (3), wherein when the detected number of rotations of the film driven roller is equal to or larger than a predetermined value, the wind-up operation is stopped immediately after detection of a second perforation.

(8) A camera described in the arrangements (1) to (3), wherein when the detected number of rotations of the film driven roller is equal to or larger than a predetermined value, the wind-up operation is stopped immediately after detection of a second perforation, the rewind operation is started, and the rewind operation is stopped in response to detection of a next perforation.

(9) A camera described in the arrangements (1) to (3), wherein when the detected number of rotations of the film driven roller is smaller than a predetermined value, the wind-up operation is stopped immediately after detection of a second perforation.

(10) A camera which can use a film having two perforations per photographing region of one frame, and uses a battery as a power supply, comprising:

film feeding means for feeding a film by means of a motor;

perforation detection means for detecting a perforation on the film;

film movement detection means, having a film driven roller which contacts the film and is rotated upon movement of the film, for detecting the movement of the film by detecting the number of rotations of the film driven roller; and electrically rewritable nonvolatile memory means for storing predetermined data, wherein information indicating that a film feeding operation is being performed is written in the nonvolatile memory means at the beginning of the film feeding operation, so that even when an inadvertent power failure occurs during the film feeding operation, upon restart of the film feeding operation on the basis of the information stored in the nonvolatile memory means when the power supply is recovered, the film is wound up, the number of rotations of the film driven roller is detected after detection of a first perforation, and the film is fed in correspondence with the detected number of rotations.

(11) A camera which can use a film having two perforations per photographing region of one frame, and uses a battery as a power supply, comprising:

film feeding means for feeding a film by means of a motor;

perforation detection means for detecting a perforation on the film; and film movement detection means, having a film driven roller which contacts the film and is rotated upon movement of the film, for detecting the movement of the film by detecting the number of rotations of the film driven roller, wherein even when an inadvertent power failure occurs during the film feeding operation, when the power supply is recovered, the film is wound up, the number of rotations of the film driven roller is detected after detection of a first perforation, and the feeding operation of the film is stopped in correspondence with the detected number of rotations.

(12) A camera described in the arrangement (10) or (11), wherein when a predetermined number of rotations of the film driven roller are detected, the film feeding operation is stopped in response to detection of a second perforation, and when a predetermined number of rotations of the film driven roller are not detected, the film feeding operation is stopped in response to detection of a third perforation.

(13) A camera which can use a film having two perforations per photographing region of one frame, and uses a battery as a power supply, comprising:

film feeding means for feeding a film by means of a motor;

perforation detection means for detecting a perforation on the film;

film movement detection means, having a film driven roller which contacts the film and is rotated upon movement of the film, for detecting the movement of the film by detecting the number of rotations of the film driven roller; and electrically rewritable nonvolatile memory means for storing predetermined data, wherein information indicating that a film feeding operation is being performed is written in the nonvolatile memory means at the beginning of the film feeding operation, so that even when an inadvertent power failure occurs during the film feeding operation, when the power supply is recovered, the film is rewound on the basis of the information stored in the nonvolatile memory means, the rewind operation is stopped when a predetermined number of rotations of the film driven roller are detected, the film is wound up, the wind-up operation is stopped upon detection of a second perforation, the rewind operation is stopped when a perforation is detected before a predetermined number of rotations of the film driven roller are detected during the rewind operation, the film is wound up, the film feeding operation is stopped upon detection of a second perforation when a predetermined number of rotations of the film driven roller are detected, and the film feeding operation is stopped upon detection of a first perforation before a predetermined number of rotations of the film driven roller are detected.

(14) A camera which can use a film having two perforations per photographing region of one frame, and uses a battery as a power supply, comprising:

film feeding means for feeding a film by means of a motor;

perforation detection means for detecting a perforation on the film;

film movement detection means, having a film driven roller which contacts the film and is rotated upon movement of the film, for detecting the movement of the film by detecting the number of rotations of the film driven roller; and electrically rewritable nonvolatile memory means for storing predetermined data, wherein information indicating that a film feeding operation is being performed is written in the nonvolatile memory means at the beginning of the film feeding operation, so that even when an inadvertent power failure occurs during the film feeding operation, when the power supply is recovered, the film is rewound on the basis of the information stored in the nonvolatile memory means, the rewind operation is stopped when a predetermined number of rotations of the film driven roller are detected, the film is wound up, the wind-up operation is stopped upon detection of a first perforation, the rewind operation is stopped when a perforation is detected before a predetermined number of rotations of the film driven roller are detected during the rewind operation, the film is wound up, the film feeding operation is stopped upon detection of a first perforation when a predetermined number of rotations of the film driven roller are detected, and the film feeding operation is stopped upon detection of a second perforation when detection of a first perforation is made before a predetermined number of rotations of the film driven roller are detected.

(15) A camera which can use a film having two perforations per photographing region of one frame, and uses a battery as a power supply, comprising:

film feeding means for feeding a film by means of a motor;

perforation detection means for detecting a perforation on the film;

film movement detection means, having a film driven roller which contacts the film and is rotated upon movement of the film, for detecting the movement of the film by detecting the number of rotations of the film driven roller; and electrically rewritable nonvolatile memory means for storing predetermined data, wherein information indicating that a film feeding operation is being performed and information indicating a use state of the film are written in the nonvolatile memory means at the beginning of the film feeding operation, so that even when an inadvertent power failure occurs during the film feeding operation, when the power supply is recovered, the film is rewound on the basis of the information stored in the nonvolatile memory means, the rewind operation is stopped a predetermined period of time after no more rotations of the film driven rollers are detected, and a film use state indication member provided to a patrone is driven on the basis of the film use state information after the film is completely stored in the patrone.

(16) A camera which can use a film having two perforations per photographing region of one frame, and uses a battery as a power supply, comprising:

film feeding means for feeding a film by means of a motor;

perforation detection means for detecting a perforation on the film;

film movement detection means, having a film driven roller which contacts the film and is rotated upon movement of the film, for detecting the movement of the film by detecting the number of rotations of the film driven roller; and electrically rewritable nonvolatile memory means for storing predetermined data, wherein information indicating that a wind-up operation is being performed is written in the nonvolatile memory means at the beginning of a one-frame wind-up operation of the film, and even when an inadvertent power failure occurs during the wind-up operation, when the power supply is recovered, the wind-up operation is performed on the basis of the information stored in the nonvolatile memory means, and is stopped in response to detection of a first perforation when a predetermined number of rotations of the film driven roller are detected before the first detection of the perforation.

As described above, according to the second to eighth embodiments of the present invention, a camera which uses a film having two perforations per frame, and has a film feeding controller which can set the next photographing frame to be photographed at a precise position with respect to the photographing region even when the power supply is interrupted during a film feeding operation can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera adapted to be used with a film cartridge comprising a data disk which stores film exposure information containing at least three exposure states of the film, and information inherent to the film, said exposure information indicating whether the film is fully exposed, partially exposed, or not exposed, the camera comprising:

- a replaceable power source battery;
- a microcomputer controlling an overall operation of the camera;
- a feeder module for feeding a film by means of a motor driving source;
- a cover detection module for detecting that a cartridge cover has changed from "opened" to "closed" states;
- a data detection module for detecting the information inherent to the film and exposure information from said data disk, when a change from "opened" to "closed" states of said cartridge cover is detected;
- a cartridge detection module for detecting loading of said film cartridge in the camera;
- a first alarm module for displaying a first alarm in cases when said cartridge cover is closed, when said exposure information indicates that the film is fully exposed, and when the loading of said cartridge is detected;
- a nonvolatile memory for storing the information inherent to the film read by said data detection module;
- a data storage control module for setting all of data bits corresponding to the information inherent to the film of said nonvolatile memory to "0" after said film has been entirely rewound into said cartridge;
- a read module for reading only the information inherent to the film of said nonvolatile memory in said microcomputer when a battery is reloaded into said camera;
- a determination module for determining whether the data bits corresponding to said information inherent to the film read by said read module are "0";
- a detection operation effecting module for effecting a data detection operation by said data detection module, to detect information from said data disk, in cases where a battery is reloaded into the camera and all of the data bits corresponding to said information inherent to the film are determined to be "0" by said determination module;
- a detection operation disabling module for disabling a data detection operation by said data detection module in cases when a battery is reloaded into the camera and when said determination module determines that the data bits corresponding to the information inherent to the film includes at least one "1"; and
- a second alarm display module for displaying a second alarm in cases when said determination module determines that the data bits corresponding to the information inherent to the film includes at least one "1" and when the exposure information read in said microcomputer indicates that the film is partially exposed.

* * * * *